United States Patent
Suzuki et al.

(10) Patent No.: US 7,905,975 B2
(45) Date of Patent: Mar. 15, 2011

(54) PROCESS FOR MANUFACTURING PREFORM AND APPARATUS THEREFOR

(75) Inventors: Tamotsu Suzuki, Otsu (JP); Haruhiko Tsuji, Inukami-gun (JP); Kounosuke Yamamoto, Iyo-gun (JP)

(73) Assignee: Toray Industries, Inc., Chou-Ku, Tokyo (*) Notice: Subject to any disclaimer, the term of this patent is extended or adjusted under 35 U.S.C. 154(b) by 204 days.

(21) Appl. No.: 12/282,726

(22) PCT Filed: Mar. 15, 2007

(86) PCT No.: PCT/JP2007/055195
§ 371 (c)(1),
(2), (4) Date: Sep. 12, 2008

(87) PCT Pub. No.: WO2007/119371
PCT Pub. Date: Oct. 25, 2007

(65) Prior Publication Data
US 2009/0050263 A1    Feb. 26, 2009

(30) Foreign Application Priority Data
Mar. 15, 2006 (JP) .................. 2006-070777

(51) Int. Cl.
*B29C 47/00* (2006.01)

(52) U.S. Cl. ........ 156/245; 156/180; 156/181; 156/196; 156/200; 156/201; 156/202; 156/216; 156/228; 156/242; 156/292; 156/311; 156/324; 156/438; 156/441; 156/463; 156/499

(58) Field of Classification Search .................. 156/180, 156/181, 196, 200, 201, 202, 216, 228, 242, 156/245, 292, 311, 324, 438, 441, 463, 499
See application file for complete search history.

(56) References Cited

U.S. PATENT DOCUMENTS

| 4,151,031 A | 4/1979 | Goad et al. |
| 5,716,487 A * | 2/1998 | Sumerak .................. 156/359 |
| 6,592,795 B2 * | 7/2003 | Kasai et al. .................. 264/241 |
| 6,701,990 B1 | 3/2004 | Burley et al. |

FOREIGN PATENT DOCUMENTS

| JP | 01-285315 | 11/1989 |
| JP | 2001-191418 | 7/2001 |
| JP | 2005-324513 | 11/2005 |
| JP | 2006-233120 | 9/2006 |

OTHER PUBLICATIONS

International Search Report for International Application No. PCT/JP2007/055195 mailed Jun. 19, 2007.

* cited by examiner

*Primary Examiner* — Kat Wyrozebski
*Assistant Examiner* — Joshel Rivera
(74) *Attorney, Agent, or Firm* — RatnerPrestia

(57) ABSTRACT

A process for manufacturing a preform, and apparatus therefor, wherein a preform with a branched portion in its cross-section profile is continuously manufactured by delivering a raw form of reinforcing fiber base material with a branched portion in its cross-section profile, among multiple reinforcing fiber base materials for constructing the preform, intermittently in the longitudinal direction thereof; at each delivery discontinuation, performing heat and/or pressure application to the raw base material so as to tentatively obtain a preliminary shaped matter with given configuration; and uniting the obtained preliminary shaped matter with given configuration with raw forms of other reinforcing fiber base materials for constructing the preform.

14 Claims, 6 Drawing Sheets

US 7,905,975 B2

PROCESS FOR MANUFACTURING PREFORM AND APPARATUS THEREFOR

This is a U.S. National Phase application of application number PCT/JP2007/055195, filed Mar. 15, 2007 (which is incorporated herein by reference in its entirety), which claims priority benefit of JP 2006-070777 filed Mar. 15, 2006.

FIELD OF THE INVENTION

The present invention relates to a process and an apparatus for manufacturing a preform to be used for molding of fiber reinforced plastics (FRP). More specifically, the invention relates to a process for manufacturing a preform, in a cross-section thereof, having a web portion and at least one pair of flange portions extending in opposite side each other through a branch portion from the web portion, and an apparatus therefor. Typical preforms that have such a cross-sectional configuration include those with a T-shaped or I-shaped cross-section.

BACKGROUND OF THE INVENTION

Fiber reinforced plastics (FRP) comprising reinforcing fibers such as carbon fibers, glass fibers or aramid fibers are used as material for structural members of automobiles and aircraft, etc. because they are light in weight and high in durability.

An autoclave molding has been known as a method to mold fiber reinforced plastics (FRP). With this molding method, a layered product of prepreg sheets comprising reinforcing fibers and high-ductility epoxy resin, for instance, is pressed and heated in an autoclave for curing to produce fiber reinforced plastics (FRP).

It is generally difficult, however, for prepreg sheets to serve for molding products having a complicated three-dimensional shape. Under the existing circumstances, autoclave molding of conventional prepreg sheets has not been widely practiced because it needs high material costs and long molding process times, which will lead to high overall product manufacturing costs.

Compared to this, a resin transfer molding (RTM) and a vacuum RTM are attracting attention because these molding methods can work at lower costs and shorter molding process times than an autoclave molding of conventional prepreg sheets.

In the RTM process, a layered product of dry reinforcing fiber cloths having no impregnated matrix resin is placed in a mold and a low-viscosity liquid matrix resin is injected to allow the reinforcing fibers to be impregnated with the matrix resin to achieve molding of fiber reinforced plastics (FRP).

As the RTM process uses the dry reinforcing fiber cloth as described above, it is possible to shape the reinforcing fiber cloth along a complicated three-dimensional shape in a mold. However, wrinkle-free, uniform fiber reinforced plastic (FRP) products having a high volume percentage of fiber (Vpf) such has those produced by an autoclave molding of prepreg sheets cannot be produced easily by simply placing the layered product of reinforcing fiber cloths along a surface of the mold. The volume percentage of fiber is defined as the percentage by volume of fiber relative to the total volume of the material containing that fiber.

In a method to solve this problem, there is a method using a preform that is pre-formed in a shape of a final product in a dry state without a matrix resin impregnation. However, the time required to prepare such a preform and the accuracy of the resulting preform will have large influence on the production cost and quality of the final fiber reinforced plastic (FRP) product.

Thus, a preform production process that can be performed in a shorter time is proposed in Patent Literature 1.

The process disclosed in Patent Literature 1, however, cannot work satisfactorily to provide a wrinkle-free, uniform preform having a high volume percentage of fiber (Vpf) that can be used for molding of fiber reinforced plastics (FRP) having high mechanical characteristics such as those for aircraft's structural members.

CITATION LIST

Patent Literature 1: JP 2005-324513 A

SUMMARY OF INVENTION

The invention provides a preform manufacturing process that can continuously produce a wrinkle-free, uniform preform having a high volume percentage of fiber (Vpf) that can be used for molding of fiber reinforced plastics (FRP) having high mechanical characteristics such as those for aircraft's structural members, and also provide a manufacturing apparatus therefor.

The present inventors studied on why a wrinkle-free, uniform preform having a high volume percentage of fiber (Vpf) that can be used for molding of fiber reinforced plastics (FRP) having high mechanical characteristics could not be produced by simply using a combination of folding, lamination, adhesion, etc. of reinforcing fiber cloths, and turn their attention to the straightness of the reinforcing fiber in the course of the manufacturing process and the uniformity of reinforcing fiber density in the intermediate product.

Subsequently, they attempted to provide, in the manufacturing process, a partial shape forming step in which a fiber base material constituting a major portion of a preform to be manufactured was pre-formed for forming a preliminary shaped body. They tried to obtain an intended preform by uniting the resulting preliminary shaped body and a fiber base material constituting another portion of the preform in a uniting step providing after the partial shape forming step.

They found that wrinkles that would result from the difference in the circumference between the inside and outside of the fiber base material during the pressing in the thickness direction in producing a preform in the uniting step were completely eliminated or minimized to a very low level by properly distributing heating and/or pressing conditions of the fiber base material among in the partial shape forming step and the subsequent uniting step.

The process to manufacture such a preform and the manufacturing apparatus therefor according to aspects of the invention are described below:

(1) A process for manufacturing a preform comprising a first reinforcing fiber base material having, in its cross-section, a web portion and at least one pair of flange portions extending in opposite side each other through at least one branching portion from the web portion, and at least one second reinforcing fiber base material that is united with the first reinforcing fiber base material in a state including the at least one branching portion between them wherein:

(a) the first reinforcing fiber base material comprises a first raw base material and a second raw base material, (b) the first raw base material comprises a first layered strip comprising layered multiple reinforcing fiber cloths and an is adhesive resin provided between the layered reinforcing fiber cloths, (c) the second raw base material comprises a second layered strip comprising layered multiple reinforcing fiber cloths and an adhesive resin provided between the layered reinforcing fiber cloths, (d) the second reinforcing fiber base material comprises at least one third raw base material, (e) a first supply step for supplying the first layered strip, a second supply step for supplying the second layered strip, and at least one third supply step for supplying the at least one third raw base material are provided, (f) a first partial shaping step is provided on the downstream side of the first supply step for shaping the first layered strip by heating and/or pressing and maintaining the shaped state, thereby producing a first preliminary shaped body, (g) a second partial shaping step is provided on the downstream side of the second supply step for shaping the second layered strip by heating and/or pressing and maintaining the shaped state, thereby producing a second preliminary shaped body, (h) a uniting step is provided on the downstream side of the first and second partial shaping steps and the at least one third supply step to unite the first and second preliminary shaped bodies produced in the first and second partial shaping steps in such a way that the branching portion is formed in the preform and the at least one third raw base material is added at the branching portion formed, followed by uniting them by heating and/or pressing them in the configuration and maintaining the united state, thereby providing the preform, (i) a conveyance step is provided on the downstream side of the uniting step to intermittently convey the preform produced in the uniting step, and (j) the production of the first and second preliminary shaped bodies in the first and second partial shaping steps and the production of the preform in the uniting step are carried out during the periods when the conveyance of the preform in the conveyance step is suspended.

(2) The process for manufacturing a preform, wherein said first and second preliminary shaped bodies meet the relationship $0.95 \geq \alpha/\beta \geq 0.6$ where $\alpha$ is their respective volume percentage of fiber and $\beta$ is the volume percentage of fiber in said preform.

(3) The process for manufacturing a preform, wherein said volume percentage of fiber of $\alpha$ and said volume percentage of fiber of $\beta$ meet the relationship $0.95 \geq \alpha/\beta \geq 0.8$.

(4) The process for manufacturing a preform, wherein a trimming step is provided on the downstream side of said uniting step and on the upstream side of said conveyance step to remove unnecessary parts from the preform produced in said uniting step.

(5) The process for manufacturing a preform, wherein at least one corner filler supply step is provided so that at least one corner filler comprising a reinforcing fiber bundle is supplied to at least one concave portion formed along the outer surface of said at least one branching portion produced in said uniting step in coordination with the intermittent preform conveyance motion in said conveyance step.

(6) The process for manufacturing a preform, wherein the reinforcing fiber bundle constituting said corner filler is a reinforcing fiber bundle containing an adhesive resin, and at least one corner filler partial shaping step that shapes said reinforcing fiber bundle containing the adhesive resin by heating and/or pressing and maintaining the shaped state to produce at least one preliminary shaped corner filler body is provided between said at least one corner filler supply step and said uniting step to allow the preliminary shaped corner filler body thus produced to be supplied to said uniting step.

(7) The process for manufacturing a preform, wherein said at least one third raw base material comprises at least one third layered strip comprising layered multiple reinforcing fiber cloths and an adhesive resin provided between the layered reinforcing fiber cloths, and at least one third partial shaping step that shapes said at least one third layered strip by heating and/or pressing and maintaining the shaped state to produce at least one third preliminary shaped body is provided between said at least one third supply step and said uniting step to allow said at least one third preliminary shaped body thus produced to be supplied to said uniting step.

(8) The process for manufacturing a preform, wherein the cross-section of said first preliminary shaped body and that of said second preliminary shaped body have L shapes that are bilaterally symmetric while one cross-section of said one third preliminary shaped body has a flat plate shape, and wherein in said uniting step, said L-shaped first preliminary shaped body and said L-shaped second preliminary shaped body are united at the position corresponding to said L-shaped web portion while said flat-plate-shaped third preliminary shaped body and said preliminary shaped corner filler body are united to form a T-shaped preform.

(9) The process for manufacturing a preform, wherein the cross-section of said first preliminary shaped body and that of said second preliminary shaped body have C shapes that are bilaterally symmetric while the cross-sections of said two third preliminary shaped bodies have flat plate shapes, and wherein in said uniting step, said C-shaped first preliminary shaped body and said C-shaped second preliminary shaped body are united at the position corresponding to said C-shaped web portion while said two flat-plate-shaped third preliminary shaped bodies are united with said two preliminary shaped corner filler bodies to form an I-shaped preform.

(10) An apparatus for manufacturing a preform comprising a first reinforcing fiber base material having, in its cross-section, a web portion and at least one pair of flange portions extending in opposite side each other through at least one branching portion from the web portion, and at least one second reinforcing fiber base material that is united with the first reinforcing fiber base material in a state including the at least one branching portion between them wherein:

(a) the first reinforcing fiber base material comprises a first raw base material and a second raw base material, (b) the first raw base material comprises a first layered strip comprising layered multiple reinforcing fiber cloths and an adhesive resin provided between the layered reinforcing fiber cloths, (c) the second raw base material comprises a second layered strip comprising layered multiple reinforcing fiber cloths and an adhesive resin provided between the layered reinforcing fiber cloths, (d) the second reinforcing fiber base material comprises at least one third raw base material, (e) a first supply unit to supply the first layered strip, a second supply unit to supply the second layered strip, and at least one third supply unit to supply the at least one third raw base material are provided, (f) a first partial shaping unit is provided on the downstream side of the first supply unit to shape the first layered strip by heating and/or pressing and maintaining the shaped state, thereby producing a first preliminary shaped body, (g) a second partial shaping unit is provided on the downstream side of the second supply unit to shape the second layered strip by heating and/or pressing and maintaining the shaped state, thereby producing a second preliminary shaped body, (h) a uniting unit is provided on the downstream side of the first and second partial shaping units and the at least one third supply unit to unite the first and second preliminary shaped bodies produced in the first and second partial shaping units in such a way that the branching portion is formed in the preform and the at least one third raw base material is added at the branching portion formed, followed by uniting them by heating and/or pressing them in the configuration and maintaining the united state, thereby providing the preform, (i) a conveyance unit is provided on the downstream side of the uniting unit to intermittently convey the preform produced in the uniting unit, and (j) the production of the first and second preliminary shaped bodies in the first and second partial shaping units and the production of the preform in the uniting unit are carried out during the periods when the conveyance of the preform in the conveyance unit is suspended.

(11) The apparatus for manufacturing a preform, wherein a trimming unit is provided on the downstream side of said uniting unit and on the upstream side of said conveyance unit to remove unnecessary parts from the preform produced in said uniting unit.

(12) The apparatus for manufacturing a preform, wherein at least one corner filler supply unit is provided so that at least one corner filler comprising a reinforcing fiber bundle is supplied to at least one concave portion formed along the outer surface of said at least one branching portion produced in said uniting unit in coordination with the intermittent preform conveyance motion in said conveyance unit.

(13) The apparatus for manufacturing a preform, wherein the reinforcing fiber bundle constituting said corner filler is a reinforcing fiber bundle containing an adhesive resin, and at least one corner filler partial shaping unit that shapes said reinforcing fiber bundle containing the adhesive resin by heating and/or pressing and maintaining the shaped state to produce at least one preliminary shaped corner filler body is provided between said at least one corner filler supply unit and said uniting unit to allow the preliminary shaped corner filler body thus produced to be supplied to said uniting unit.

(14) The apparatus for manufacturing a preform, wherein said at least one third raw base material comprises at least one third layered strip comprising layered multiple reinforcing fiber cloths and an adhesive resin provided between the layered reinforcing fiber cloths, and at least one third partial shaping unit that shapes said at least one third layered strip by heating and/or pressing and maintaining the shaped state to produce at least one third preliminary shaped body is provided between said at least one third supply unit and said uniting unit to allow said at least one third preliminary shaped body thus produced to be supplied to said uniting unit.

(15) The apparatus for manufacturing a preform, wherein the cross-section of said first preliminary shaped body and that of said second preliminary shaped body have L shapes that are bilaterally symmetric while one cross-section of said one third preliminary shaped body has a flat plate shape, and wherein in said uniting unit, said L-shaped first preliminary shaped body and said L-shaped second preliminary shaped body are united at the position corresponding to said L-shaped web portion while said flat-plate-shaped third preliminary shaped body and said preliminary shaped corner filler body are united to form a T-shaped preform.

(16) The apparatus for manufacturing a preform, wherein the cross-section of said first preliminary shaped body and that of said second preliminary shaped body have C shapes that are bilaterally symmetric while the cross-sections of the two third preliminary shaped bodies have a flat plate shape, and wherein in said uniting unit, said C-shaped first preliminary shaped body and said C-shaped second preliminary shaped body are united at the position corresponding to said C-shaped web portion while said two flat-plate-shaped third preliminary shaped bodies are united with two preliminary shaped corner filler bodies to form an I-shaped preform.

(17) The apparatus for manufacturing a preform, comprising said first partial shaping unit, said second partial shaping unit and said third partial shaping unit that are combined into one partial shaping die wherein:

(a) said partial shaping die comprises a central die fixed on a stand, an upper die provided above said central die with a gap in between, and a lower die provided below said central die with a gap in between, (b) said upper die and said central die have first shaping faces to receive and then heat and/or press said first layered strip and second shaping faces to receive and then heat and/or press said second layered strip, (c) said lower die and said central die have third shaping faces to receive and then heat and/or press said third layered strip, (d) a first actuator to move said upper die relative to said central die is provided on said upper die while a second actuator to move said lower die relative to said central die is provided on said lower die, and (e) a hole is provided in the central region of said central die to allow said preliminary shaped corner filler body to pass through.

(18) The apparatus for manufacturing a preform, comprising said at least one corner filler partial shaping unit wherein:

(a) the unit comprises a corner filler shaping die comprising a flat die fixed on a stand, and a right and a left upper dies fixed respectively on the top face of said flat die, (b) said right upper die has a left-side curved face in its left lower edge while said left upper die has a right-side curved face in its right lower edge, said right upper die and said left upper die being in contact with each other in such a way that said left-side curved face and said right-side curved face are faced with each other, (c) the portion surrounded by the flat die's top face, said left-side curved face and said right-side curved face constitutes a hole to allow a reinforcing fiber bundle to pass through, said reinforcing fiber bundle being used to produce the corner filler to be supplied from said at least one corner filler supply unit, and (d) the cross-sectional size of said hole gradually decreases in the traveling direction of said reinforcing fiber bundle.

(19) The apparatus for manufacturing a preform, comprising said uniting unit wherein:

(a) said uniting unit comprises a uniting die comprising a left upper die fixed on a stand, a right upper die provided on the right side of said left upper die with a gap in between and a lower die provided below said left upper die and said right upper die with a gap in between, (b) said left upper die and said right upper die respectively have a first shaping face that belongs to said left upper die, and a second shaping face that belongs to said right upper die, to receive and heat and/or press said first preliminary shaped body and said second preliminary shaped body, (c) said left upper die and said lower die respectively have a third shaping face that belongs to said left upper die, and a fourth shaping face that belongs to said lower die to receive and heat and/or press said first preliminary shaped body and said third preliminary shaped body, (d) said right upper die and said lower die respectively have a fifth shaping face that belongs to said right upper die, and a sixth shaping face that belongs to said lower die to receive and heat and/or press said second preliminary shaped body and said third preliminary shaped body, and (e) a first actuator is provided on said right upper die to move said right upper die relative to said left upper die while a second actuator is provided on said lower die to move said lower die relative to said left upper die and said right upper die.

Advantageous Effects of Invention

A preform manufacturing process or manufacturing apparatus according to aspects of the invention serves to intermittently convey in the longitudinal direction a raw base material for a reinforcing fiber base material having a branching portion in its cross-section that will constitute an intended preform, and heat and/or press the raw base material during a conveyance suspension periods to form a preliminary shaped body, followed by uniting the resulting preliminary shaped body with the raw base material for another reinforcing fiber base material that will constitute the intended preform, thereby enabling continuous production of the preform that has a branching portion in its cross-section.

Thus, the invention makes it possible to produce a high quality preform by preventing a decrease in the straightness of the reinforcing fiber, a decrease in the uniformity of the density, and in particular, wrinkles in the bent portion in the raw base material that would result from differences in the circumference between the inner and outer surfaces of the raw base material, all of which could take place when the two or more raw base materials for the reinforcing fiber base materials used to produce the intended preform are simply united by one heating and/or pressing step.

REFERENCE SIGNS LIST

Figure 1:
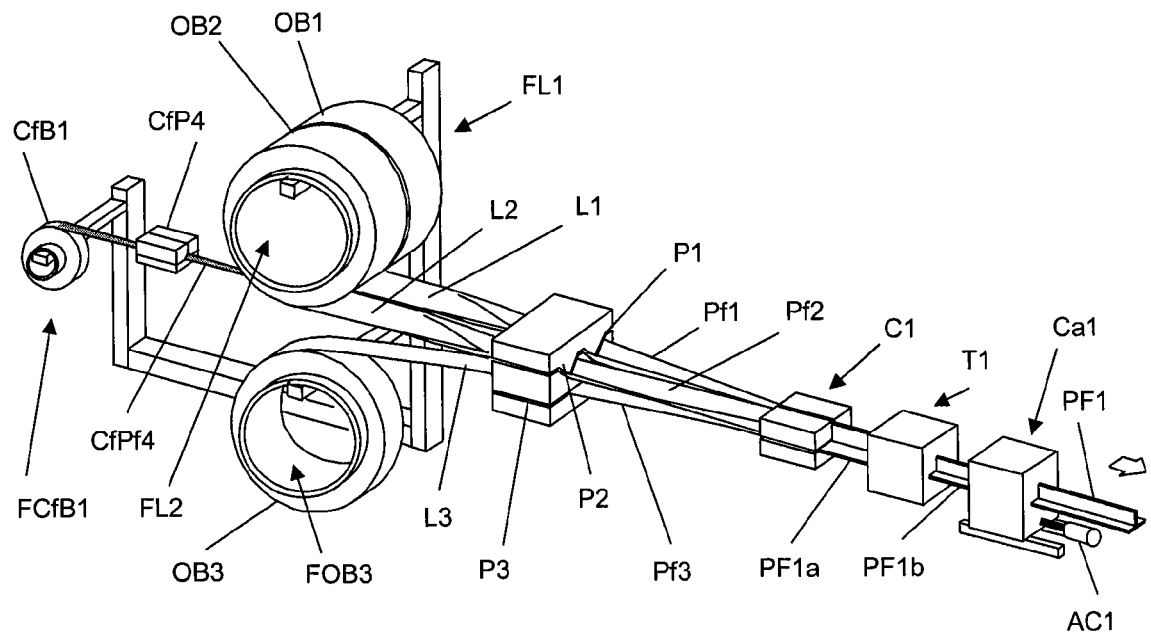
FIG. 1 shows a schematic perspective view of a typical preform manufacturing apparatus according to one embodiment of the invention.

B1: branching portion
C1: uniting unit
Ca1: conveyance unit
Cf1: corner filler
CfB1: raw base material for corner filler
CfP4: corner filler partial shaping unit
CfPf4: preliminary shaped corner filler body
F1, F1a, F1b: flange portion
FL1: first supply unit
FL2: second supply unit
FB1: first reinforcing fiber base material
FB2: second reinforcing fiber base material
FCfB1: corner filler supply unit
FOB3: third supply unit
L1: first layered strip
L2: second layered strip
L3: third layered strip
OB1: first raw base material
OB2: second raw base material
OB3: third raw base material
P1: first partial shaping unit
P2: second partial shaping unit
P3: third partial shaping unit
PF1, PF1a, PF1b, PF2: preform
Pf1: first preliminary shaped body
Pf2: second preliminary shaped body
Pf3: third preliminary shaped body
T1: trimming unit
W1: web portion
6a, 6b: preliminary shaped body
7d, 7e, 7f, 7g: preliminary shaped body
8a: preform
9a: preform
10a: material supply unit
20: corner filler shaping die
20a: filler shaping unit
30: partial shaping die
30a: partial shaping unit
40: uniting-shaping die
40a: uniting unit
50: preform gripping die
50a: trimming unit
60a: traction unit

DETAILED DESCRIPTION

Some embodiments of the preform manufacturing process and manufacturing apparatus of the invention are described below by referring to drawings.

A preform PF1 to be finally manufactured from a manufacturing apparatus (process) illustrated in FIG. 1 has a T-shaped cross-section. A detailed perspective view of the preform is shown in FIG. 2.

Figure 2:
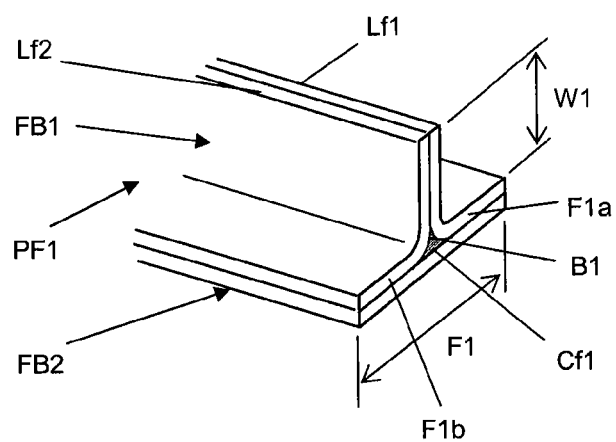
FIG. 2 shows a perspective view of a typical T-shaped preform to be produced by the manufacturing apparatus illustrated in FIG. 1.

In FIG. 2, the preform PF1 comprises a first reinforcing fiber base material FB1 which has, in its cross-section, a web portion W1 and flange portions F1a and F1b extending on either side from the web portion W1 through a branching portion B1, and a second reinforcing fiber base material FB2 which is united with the first reinforcing fiber base material FB1 with the branching portion B1 being contained between them. A concave portion formed along the outer surface of the branching portion B1 is closed by the second reinforcing fiber base material FB2 along the longitudinal direction of the preform PF1 and a gap is formed in the longitudinal direction of the preform PF1. The gap is filled with a corner filler Cf1.

A flange portion F1 of the preform PF1 comprises the flange portions F1a and F1b and the second reinforcing fiber base material FB2. The web portion W1 is in the vertical direction relative to the flange portion F1 which is placed in the horizontal direction, that is, to the flange portions F1a and F1b and the second reinforcing fiber base material FB2 which are placed in the horizontal direction.

In FIG. 1, the first reinforcing fiber base material FB1 comprises a first raw base material OB1 and a second raw base material OB2. The first raw base material OB1 comprises a first layered strip L1 comprising layered multiple reinforcing fiber cloths and an adhesive resin provided in the interlayers. The second raw base material OB2 comprises a second layered strip L2 comprising layered multiple reinforcing fiber cloths and an adhesive resin provided in the interlayers. The second reinforcing fiber base material FB2 comprises a third raw base material OB3.

In FIG. 1, the preform manufacturing apparatus (process) according to one embodiment of the invention comprises a first supply unit (step) FL1 that supplies the first layered strip L1, a second supply unit (step) FL2 that supplies the second layered strip L2 and a third supply unit (step) FOB3 that supplies the third base material OB3.

A first partial shaping unit (step) P1 is provided on the downstream side of the first supply unit (step) FL1 to shape the first layered strip L1 by heating and/or pressing and maintaining the shaped state, thereby producing a first preliminary shaped body Pf1. A second partial shaping unit (step) P2 is provided on the downstream side of the second supply unit (step) FL2 to shape the second layered strip L2 by heating and/or pressing and maintaining the shaped state, thereby producing a second preliminary shaped body Pf2.

A uniting unit (step) C1 is provided on the downstream side of the first and second partial shaping unit (step) P1 and P2 and the third supply unit (step) FOB3 to combine the first and second preliminary shaped bodies Pf1 and Pf2, which are produced in the first and second partial shaping units (steps) P1 and P2, so that they form the branching portion B1 in the preform PF1, and to combine them with the third raw base material OB3 so that it comes in contact with the branching portion B1 formed above, followed by heating and/or pressing them in this state to unite them and maintaining the united state to provide a preform PF1a.

A conveyance unit (step) Ca1 is provided on the downstream side of the uniting unit (step) C1 to perform intermittent conveyance of the preform PF1 produced in the uniting unit (step) C1.

The first and second preliminary shaped bodies Pf1 and Pf2 are produced in the first and second partial shaping units (steps) P1 and P2 and the preform PF1 is formed in the uniting step C1 during the periods when the conveyance of the preform PF1 in the conveyance unit (step) Ca1 is suspended.

The T-shaped preform PF1 illustrated in FIG. 2 which is produced by the manufacturing apparatus (process) illustrated in FIG. 1 actually comprises L-shaped base materials Lf1 and Lf2, which have bilaterally symmetric cross-sections, a flat-plate-shaped second reinforcing fiber base material FB2 and a corner filler Cf1. The bilaterally symmetric L-shaped base materials Lf1 and Lf2 are united with each other in their web portions, and united further with the flat-plate-shaped second reinforcing fiber base material FB2 in the flange portion, and the branching portion B1 of the preform PF1 is filled with the corner filler Cf1.

In this embodiment, furthermore, the third raw base material OB3 that forms the flat-plate-shaped second reinforcing fiber base material FB2 comprises layered multiple reinforcing fiber cloths and an adhesive resin provided in the interlayers as in the same manner as in the first raw base material OB1 and the second raw base material OB2.

In this embodiment, furthermore, a reinforcing fiber bundle that forms the corner filler Cf1 comprises a reinforcing fiber bundle that contains adhesive resin.

For manufacturing the preform PF1, the manufacturing apparatus (process) of this embodiment illustrated in FIG. 1 has a third partial shaping unit (step) P3 between the third supply unit (step) FOB3 and the uniting unit (step) C1 to shape a third layered strip L3 by heating and/or pressing and maintaining the shaped state, thereby providing a third preliminary shaped body Pf3.

The manufacturing apparatus (process) illustrated in FIG. 1, furthermore, has a corner filler partial shaping unit (step) CfP4 between a corner filler supply unit (step) FCfB1, which supplies the reinforcing fiber bundle containing adhesive resin (a raw base material for corner filler) CfB1, and the uniting unit (step) C1 to shape the reinforcing fiber bundle containing adhesive resin (the raw base material for corner filler) CfB1 by heating and/or pressing and maintaining the shaped state to provide a preliminary shaped corner filler body CfPf4.

The manufacturing apparatus (process) illustrated in FIG. 1, furthermore, has a trimming unit (step) T1 between the uniting unit (step) C1 and the conveyance unit (step) Ca1 to remove unnecessary parts from the preform PF1a produced in the uniting unit (step) C1.

A conventional tape supply unit that serves for continuous or intermittent supply of tape may be used as the first supply unit FL1, which works to pull out the first raw base material OB1 (the first layered strip L1), which is wound in a roll and fixed on a frame, and supplies it to the first partial shaping unit P1. A similar tape supply unit may also be used as the second supply unit FL2, the third supply unit FOB3 and the corner filler supply unit FCfB1.

Figure 3:
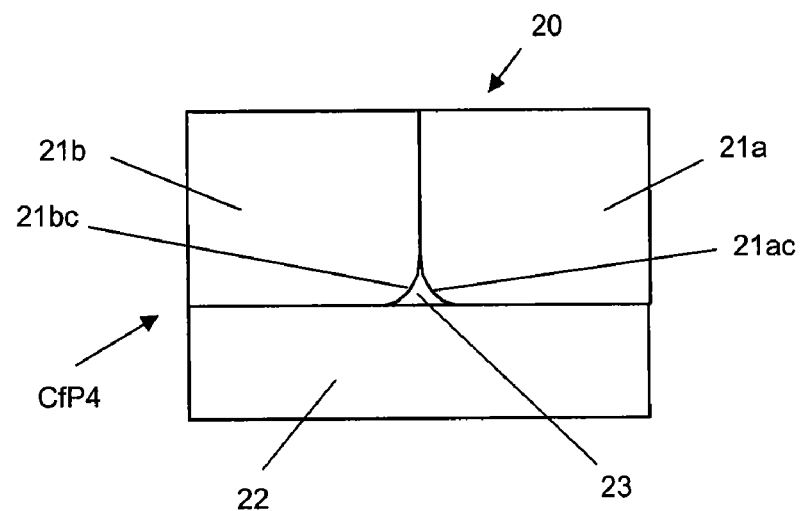
FIG. 3 shows a schematic front view of a typical corner filler shaping die to be used in the corner filler partial shaping unit of the manufacturing apparatus illustrated in FIG. 1.

FIG. 3 shows a typical corner filler partial shaping unit CfP4 that produces the preliminary shaped corner filler body CfPf4. In FIG. 3, the corner filler partial shaping unit CfP4 comprises a corner filler shaping die 20. The corner filler shaping die 20 comprises a flat die 22 fixed on a stand, as well as a right upper die 21a and a left upper die 21b that are fixed on the top face of the flat die 22. The right upper die 21a has a left-side curved face 21ac at the left lower edge while the left upper die 21b has a right-side curved face 21bc at the right lower edge. The right upper die 21a and the left upper die 21b are in contact with each other in such a way that the left-side curved face 21ac and the right-side curved face 21bc are faced with each other.

The portion surrounded by the top face of the flat die 22, the left-side curved face 21ac and the right-side curved face 21bc constitutes a hole 23 to allow the raw base material for corner filler (reinforcing fiber bundle) CfB1 to pass through. The raw base material for corner filler is used to produce the corner filler Cf1 which is supplied from the corner filler supply unit FCfB1. The cross-sectional size of the hole 23 gradually decreases in the traveling direction of the reinforcing fiber bundle CfB1. The reinforcing fiber bundle CfB1 supplied to the hole 23 is shaped within the hole 23 to have an intended cross-section suited for filling the branching portion B1, thereby providing a preliminary shaped corner filler body CfPf4. The corner filler shaping die 20 is heated as required to facilitate the production of the preliminary shaped corner filler body CfPf4. The heating may be achieved by means of a heated fluid or electric heat supplied into the die.

Figure 4:
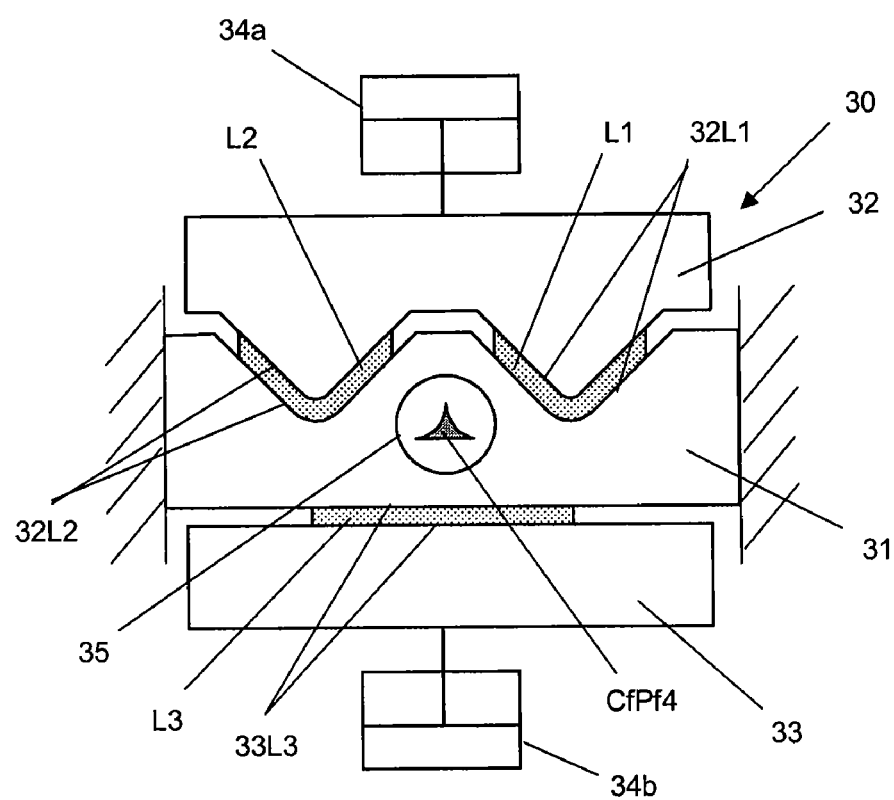
FIG. 4 shows a schematic front view of a typical partial shaping die to be used in the first, second and third partial shaping units of the manufacturing apparatus illustrated in FIG. 1.

In this embodiment, the first partial shaping unit P1, the second partial shaping unit P2 and the third partial shaping unit P3 are united into one partial shaping die. FIG. 4 shows a typical partial shaping die.

In FIG. 4, the partial shaping die 30 comprises a central die 31 fixed on a stand, an upper die 32 provided above the central die 31 with a gap in between, and a lower die 33 provided below the central die 31 with a gap in between. The upper die 32 and the central die 31 respectively has a first shaping face 32L1 to receive the first layered strip L1 and heat and/or press it, and a second shaping face 32L2 to receive the second layered strip L2 and heat and/or press it. The lower die 33 and the central die 31 respectively has a third shaping face 33L3 to receive the third layered strip L3 and heat and/or press it.

A first actuator 34a is fixed on the upper die 32 to move the upper die 32 relative to the central die 31, allowing the upper die 32 to be moved away from or close to the central die 31. A second actuator 34b is fixed on the lower die 33 to move the lower die 33 relative to the central die 31, allowing the lower die 33 to be moved away from or close to the central die 31. This structure allows the heating and pressing to be maintained during the partial shaping step and allows the die to be opened during the preform and reinforcing fiber base material conveyance step. Furthermore, a hole 35 is provided in the central region of the central die 31 to allow the preliminary shaped corner filler body CfPf4 to pass through. The circumferential size of the hole 35 is larger than that of the preliminary shaped corner filler body CfPf4 to allow the latter to pass through.

A heating unit, which is not shown in the drawing, is provided in the central die 31, upper die 32 and lower die 33. In the dies, the first layered strip L1, second layered strip L2 and third layered strip L3 are heated and pressed to achieve is partial shaping of the layered strips and soften or melt the adhesive resin provided in the interlayers so that the shape is fixed as a result of the adhesion of the interlayers, thereby providing a preliminary shaped body.

The shape of the central die 31 is such that its top face has two L-shaped concave portions (first shaping face 32L1 and second shaping face 32L2) while the bottom face is a flat plane. The upper die 32 has two L-shaped convex portions (first shaping face 32L1 and second shaping face 32L2), which form a gap against the two L-shaped concave portions of the central die 31 to produce the L-shaped cross-sections of the components Lf1 and Lf2 that constitute parts of the T-shaped cross-section. The top face of the lower die 33 is a flat plane and forms a gap against the bottom face of the central die 31 to produce the cross-section of the flat plate portion that constitutes a part of the T-shaped cross-section.

Figure 5:
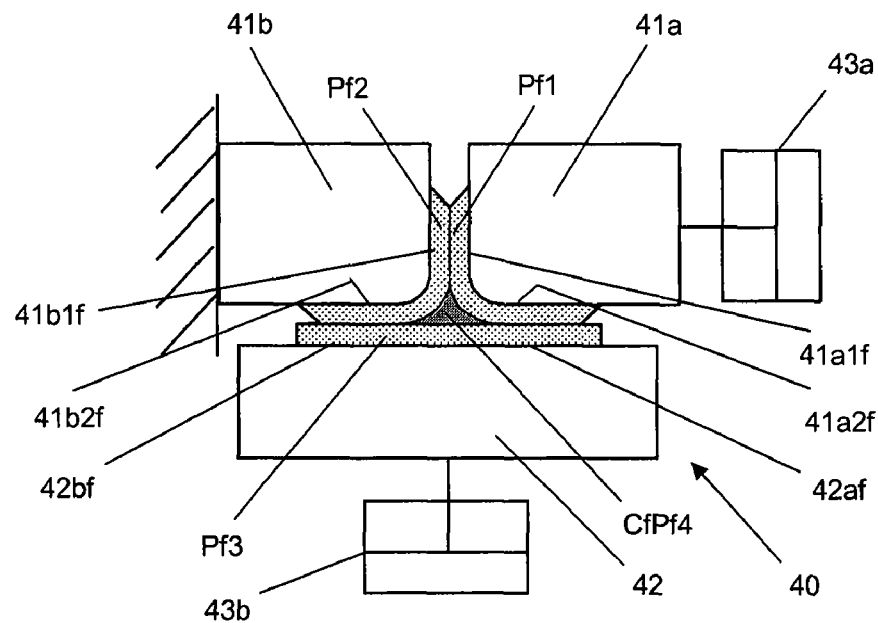
FIG. 5 shows a schematic front view of a typical uniting-shaping die to be used in the uniting unit of the manufacturing apparatus illustrated in FIG. 1.

FIG. 5 illustrates a typical uniting unit C1. In FIG. 5, the uniting unit C1 comprises one uniting-shaping die 40 comprising united components. The uniting-shaping die 40 comprises a left upper die 41b fixed on a stand, a right upper die 41a provided on the right side of the left upper die 41b with a gap in between, and a lower die 42 provided below the left upper die 41b and the right upper die 41a with a gap in between.

The right upper die 41a and the left upper die 41b respectively have a first shaping face 41a1f, which belongs to the right upper die 41a, and a second shaping face 41b1f, which belongs to the left upper die 41b, to receive and heat and/or press the first preliminary shaped body Pf1 and the second preliminary shaped body Pf2.

The right upper die 41a and the lower die 42 respectively have a third shaping face 41a2f, which belongs to the right upper die 41a, and a fourth shaping face 42af, which belongs to the lower die 42 to receive and heat and/or press the first preliminary shaped body Pf1 and the third preliminary shaped body Pf3.

The left upper die 41b and the lower die 42 respectively have a fifth shaping face 41b2f, which belongs to the left upper die 41b, and a sixth shaping face 42bf, which belongs to the lower die 42 to receive and heat and/or press the second preliminary shaped body Pf2 and the third preliminary shaped body Pf3.

A first actuator 43a is provided on the right upper die 41a to move the right upper die 41a relative to the left upper die 41b while a second actuator 43b is provided on the lower die 42 to move the lower die 42 relative to the right upper die 41a and the left upper die 41b.

With this die structure, the actuators 43a and 43b enable the right upper die 41a and the lower die 42 to be moved away from or closer to the left upper die 41b. This allows the heating and pressing to be maintained during the partial shaping step and allows the die to be opened during the preform and reinforcing fiber base material conveyance step.

A heating unit, which is not shown in the drawing, is provided in the right upper die 41a, left upper die 41b and lower die 42. In the dies, the first preliminary shaped body Pf1, second preliminary shaped body Pf2 and third preliminary shaped body Pf3 are heated and pressed to soften or melt the adhesive resin on the surface of each preliminary shaped body that has its partial shape so that the layers are adhered to each other to fix the shape of each preliminary shaped body, followed by uniting these preliminary shaped bodies to provide a preform PF1a having a T-shaped cross-section.

Figure 6:
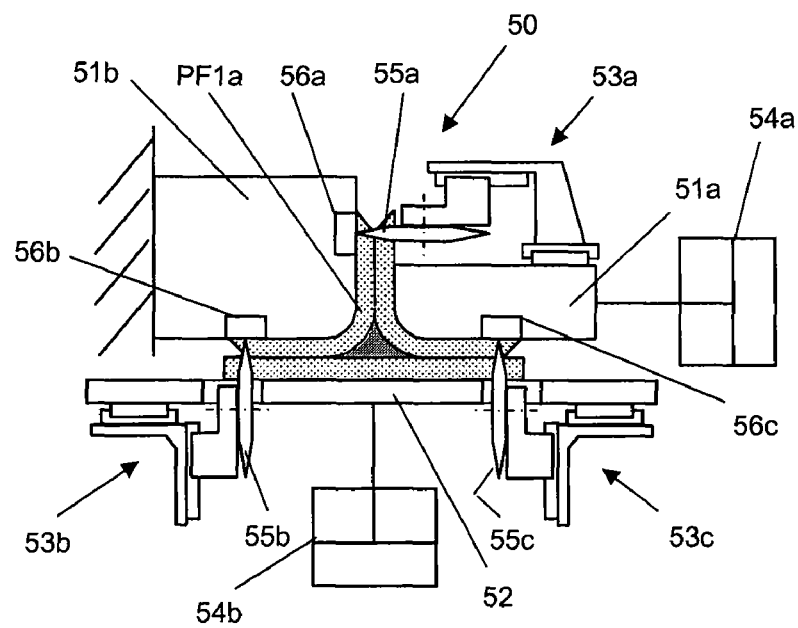
FIG. 6 shows a schematic front view of a typical preform gripping die to be used in the trimming unit of the manufacturing apparatus illustrated in FIG. 1.

FIG. 6 illustrates a typical trimming unit T1. In FIG. 6, the trimming unit T1 comprises a preform gripping die 50. The preform gripping die 50 in FIG. 6 comprises two central dies 51a and 51b and a lower die 52. The preform gripping die 50, furthermore, has trimming mechanisms 53a, 53b and 53c to remove unnecessary parts from the preform PF1a, which is produced in the uniting unit C1, to provide the preform PF1 which is the final product.

The central die 51a is fixed on a stationary base, which is not shown in the drawing, and the central die 51b and the lower die 52 are connected to an actuator 54a and an actuator 54b, respectively, so that they are pressed against or moved away from the central die 51b. This motion allows the T-shaped preform PF1a, which has just molded in the uniting unit C1, to be gripped.

The central die 51a has a trimming mechanism 53a, while the lower die 52 has two trimming mechanisms 53b and 53c, each trimming mechanisms comprising rotary cutter blades 55a, 55b or 55c. Each of this trimming mechanism has an actuator, which is not shown in the drawing, to move it in the direction toward its corresponding die and in the longitudinal direction of the preform. Each die, against which the corresponding rotary cutter blade is pressed, has a cutting mat 56a, 56b or 56c, which is made of resin, to ensure that the reinforcing fiber to be cut will be pressed firmly against the cutter blade.

Though not illustrated in detail in the drawing, the conveyance unit (traction unit) Ca1 comprises two or more dies and actuators to move them, as in the case of the uniting unit C1, and they are so configured that the T-shaped preform PF1b, which is supplied from the trimming unit T1, is gripped and that the entire mechanism to grip the preform PF1b can be moved to and fro in the longitudinal direction of the preform PF1 by means of an actuator AC1.

Each die in the corner filler shaping die 20, partial shaping die 30 and uniting-shaping die 40 contains a flow channel for heating medium, which is not shown in the drawing, and the die can be adjusted to a desired temperature by passing a heating medium adjusted to that desired temperature through the flow channel to achieve contact heating of the work piece in the die.

A process for manufacturing a T-shaped preform PF1 shown in FIG. 2 based on using the apparatus for manufacturing a preform of the invention shown in FIG. 1 is described below. As illustrated in FIG. 2, the T-shaped preform PF1 comprises bilaterally symmetric L-shaped base materials Lf1 and Lf2, a flat-plate-shaped base material FB2 and a corner filler Cf1.

First, a roll OB1 (the first raw base material) of the first layered strip L1, which will form the L-shaped base material Lf1 which is one of the two L-shaped base materials, is fitted on the first supply unit FL1. Then a roll OB2 (the second raw base material) of the second layered strip L2, which will form the other L-shaped base material Lf2, is fitted on the second supply unit FL2. Subsequently, a roll OB3 (the third raw base material) of the third layered strip L3, which will form the flat-plate-shaped base material FB2, is fitted on the third supply unit FOB3. Furthermore, a roll CfB1 (the corner filler raw base material) of a reinforcing fiber bundle impregnated with an adhesive resin, which will form the corner filler Cf1, is fitted on the corner filler supply unit FCfB1. This completes the preparation of the raw base materials.

Then, the layered strips L1, L2 and L3 and the reinforcing fiber bundle CfB1 are pulled out of these rolls and passed though the entire length of the preform manufacturing apparatus to set up an initial state. The equipment is started after an initial state is established.

In the conveyance unit Ca1, the layered strips L1, L2 and L3 and the reinforcing fiber bundle CfB1 existing there are gripped to allow the following three operations to be performed alternately: conveyance operation to pull them toward the downstream side of the manufacturing apparatus (to the right in FIG. 1), each raw base material processing operation performed in the partial shaping die 30 (see FIG. 4) and the uniting-shaping die 40 (see FIG. 5) during conveyance suspension periods, and preform processing operation performed in the preform gripping die 50 (see FIG. 6) in the trimming unit.

By these operations, the preform PF1 having a T-shaped cross-section is produced step by step in the downstream direction, and preform production in a stationary state starts when all material strips have reached the end of the equipment.

The flow of the material processing, from upstream to downstream steps, is described below. The reinforcing fiber bundle CfB1 pulled out from the corner filler roll by the traction force of the conveyance unit Ca1 provided at the downstream end travels through the hole 23 which has a cross-section corresponding to that of the corner filler to be shaped in the corner filler shaping die 20 (see FIG. 3). The right upper die 21a, left upper die 21b and flat die 22 are heated by the heating medium flowing in each die.

The hole 23 has a larger cross-section at the entrance side thereof and is processed in the inner portion thereof so as to produce a corner filler having a desired cross-sectional shape to fill the T-shaped branching portion. As the bulky reinforcing fiber bundle CfB1 is pressed and heated while passing through the hole 23, the thermoplastic resin contained is softened and deformed and the reinforcing fiber bundle CfB1 is processed to have the same cross-sectional shape as that of the intended corner filler. After coming out of the corner filler shaping die (preliminary shaping unit) 20, the reinforcing fiber bundle CfB1 processed is allowed to cool at room temperature and fixed while keeping the processed shape to become the preliminary shaped corner filler body CfPf4.

In this way, the operation at an early stage to adjust the cross-section of the corner filler to that of the final intended shape serves to allow the filler to be fed to the proper position by preventing the filler material from being pressed out of the curved portion into a straight portion and also preventing the position of the filler from being displaced to cause its density to become ununiform as the filler is united with other preliminary shaped bodies in the subsequent uniting unit C1.

On the other hand, the layered strips L1, L2 and L3 are pulled out of the respective rolls and then introduced to the partial shaping die 30 (see FIG. 4). Here, the central die 31, upper die 32 and lower die 33 are heated by the heating medium flowing inside them. The upper die 32 and lower die 33 are moved by the actuator 34a and 34b, respectively, while the dies are open, and then the layered strips L1, L2 and L3 in the dies are pressed as they are closed.

At the same time, heat is supplied from the dies to heat them and this state is maintained for a specific period of time. While maintained in such a pressed and heated state, the layered strips L1, L2 and L3 not only deform into the same shape as the respective dies but also increase in the volume percentage of fiber. In this way, each strip reaches a volume percentage of fiber that is equivalent to or nearly the same as that of the intended L-shaped and flat-plate-shaped portions that will constitute the portion of the preform having a T-shaped cross-section.

As the thermoplastic resin contained in the interlayers in each layered strip is softened and deformed, the layers of the reinforcing fiber cloths that constitute the layered strip are adhered to each other, and maintained in a pressed state.

The upper die 32 and lower die 33 are opened by means of the actuator 34a and 34b after maintaining the strip in the shaping die 30 for a specific period of time. The layered strip processed is sent downstream again by the conveyance unit Ca1 and allowed to cool so that the thermoplastic resin inside the strip cures to keep the shape formed. From the layered strips L1, L2 and L3, the L-shaped preliminary shaped bodies Pf1 and Pf2 and the flat-plate-shaped preliminary shaped body Pf3, which respectively constitute parts of the T-shaped cross-section, are produced.

In cases where adhesive resin (thermoplastic resin) has been applied over the uniting face of the layered strips, as in the interlayers, to allow the preliminary shaped bodies to be united easily in the subsequent uniting step, the preliminary shaped bodies can stick to the central die 31 by the adhesive function of the resin as the preliminary shaped bodies are taken out of the shaping die after completing the pressing and opening the die. To prevent this phenomenon, it is recommended to apply previously a release agent such as polytetrafluoroethylene (Teflon (registered trademark)) over at least the surface of the central die 31.

Furthermore, if a nozzle that feeds air to the gap between the preliminary shaped bodies and the central die 31 is provided to facilitate their release by the action of a high-speed air flow supplied in between the preliminary shaped bodies and the central die 31, such an air flow will serve effectively to prevent damage to the preliminary shaped bodies and accelerate the cooling, thereby allowing the pressed state to be maintained firmly.

Instead, a layered strip may be produced with a release sheet (release paper) that is commonly used in the field of molding of a resin, etc., provided between the layered strip and the shaping die, and the release sheet may be removed after the layered strip produced has been taken out of the shaping die.

The partial shaping die 30 shown in FIG. 4 has a structure that serves to produce a total of three preliminary shaped bodies, namely, two L-shaped ones on the top face of the central die 31 and a flat-plate-shaped one on the bottom face of the central die 31, by a single pressing motion in the vertical direction. This makes it possible to use a shaping die having a simple structure, reduce the equipment cost, and minimize the total surface area of the dies. This serves to increase the thermal efficiency of the heating medium for temperature control of the dies.

In addition, the hole 35 is provided at the center of the central die 31 in the partial shaping die 30 that is shown in FIG. 4. The preliminary shaped body CfPf4 for the corner filler that is produced in the corner filler partial shaping unit CfP4 passes through the hole 35 before reaching the uniting unit C1. The hole 35 through which the preliminary shaped body CfPf4 for the corner filler provided in the partial shaping die 30 serves to supply the preliminary shaped corner filler body CfPf4, which has become rigid by the preliminary shaping operation, to the uniting unit C1 without bending it forcibly.

This makes it possible to maintain the straightness of the preliminary shaped corner filler body CfPf4 during the final operation to provide a T-shaped preform. In designing the equipment, furthermore, a path for the preliminary shaped corner filler body CfPf4 provided in the shaping die serves to minimize the distance between the members for processing the two L-shaped components. This serves to minimize the degree of the bending force that is applied to the completed L-shaped preliminary shaped bodies Pf1 and Pf2 sent to the uniting unit C1. As a result, damage to the preliminary shaped bodies Pf1 and Pf2 during the manufacturing process can be reduced.

Then, as the resulting preliminary shaped bodies Pf1, Pf2, Pf3 and CfPf4 are conveyed downstream, they are gathered to form a T-shaped cross-section. In the present embodiment, the preliminary shaped bodies Pf1 and Pf2 that form the L-shaped portions are twisted in the opposite directions by 45° around the length axis and simultaneously bent to change the traveling direction. Then finally, the two L-shaped preliminary shaped bodies Pf1 and Pf2 are combined back to back with their perpendicular portions (web portions) in contact with each other, and the flat-plate-shaped preliminary shaped body Pf3 is added to the horizontal portion, followed by feeding the corner filler preliminary shaped body CfPf4 to the gap in the central branching portion and introducing it to the uniting unit C1.

At this point, the right upper die 41a, left upper die 41b and lower die 42 of the uniting-shaping die 40 (see FIG. 5) in the uniting unit are all open. The perpendicular and horizontal gaps between the die components that serve to produce the T-shaped cross-section should not be too large and should preferably be 1.2 to 1.5 times the total thickness of the combined preliminary shaped bodies. Such gaps can serve to allow the introduced preliminary shaped bodies to come to the proper position and fit their shapes, and also serve to minimize the damage that can be caused by abrasion with the dies when the preliminary shaped bodies are introduced.

When preliminary shaped bodies are combined with reinforcing fiber base materials in a uniting step in another embodiment, the gaps in the die should preferably be about 1.1 to 1.5 times the total thickness of the elements fed to the gaps. This serves to prevent the elements to be introduced to an improper position relative to the die. If the elements are bulky, a tapered portion or a somewhat large curved portion should preferably be provided at the inlet of the die to prevent them from being dragged when they are introduced into the die.

After the preliminary shaped bodies have been introduced into the uniting-shaping die 40, the actuator 43a works first to move the central die 41a to press the web portion of the T shape and then the actuator 43b works to move the lower die 42 to press the flange portion of the T shape. The die is heated by the heating medium flowing in it to allow the preliminary shaped bodies to be maintained in a simultaneously pressed and heated state for a specific time.

By carrying out this pressing and heating operation and maintaining that state, the thermoplastic resin applied over the surface of each preliminary shaped body is softened to perform its adhesion function to unite the preliminary shaped bodies and at the same time the volume percentage of fiber of the preliminary shaped bodies increases under compression, thereby achieving a volume percentage of fiber that is nearly equivalent to that of the product having a T-shaped cross-section.

After maintaining this state for a specific period of time, the central die 41a and the lower die 42 are moved by the actuators 43a and 43b, respectively, to open the die. Then the preliminary shaped bodies processed are conveyed downstream again by the conveyance unit Ca1 and allowed to cool after getting out of the die, and the thermoplastic resin contained inside is cured to maintain the shape, thereby producing the preform PF1a.

The preform PF1a produced in the uniting unit C1 is conveyed further downstream and introduced into the trimming unit T1. In the preform gripping die 50 in the trimming unit T1, the actuator 54a first works to move the central die 51a to grip the is T-shaped web portion and then the actuator 54b works to move the lower die 52 to grip the T-shaped flange portion. Subsequently, the trimming mechanisms 53a, 53b and 53c start to function to allow actuators that are not shown in the drawing to press the rotary cutter blades 55a, 55b and 55c against the edges of the preform PF1a, and at the same time they move in the longitudinal direction of the preform PF1a to cut the edges of the preform PF1a.

Then the rotary cutter blade 55a, 55b and 55c move away from the preform PF1a and return to their original positions, and the actuator 54a and 54b work to move the central die 51a and the lower die 52, respectively, to open the dies. The preform PF1b trimmed is conveyed downstream again by the conveyance unit Ca1.

Finally, the preform PF1b trimmed is conveyed further downstream and gripped by the preform grip mechanism contained in the conveyance unit Ca1. The actuator AC1 then actuates the preform grip mechanism in the conveyance unit Ca1 to grip the preform PF1b, and the mechanism moves downstream with the preform held. Here the preform PF1b is released and the actuator AC1 works again to move the preform grip mechanism upstream, leaving the preform PF1b on the downstream side to provide the completed preform PF1. By repeating this motion, the completed preform PF1 is sent downstream. This sequential manufacturing process continues to produce the preform PF1 having a T-shaped cross-section without interruption as long as the raw base materials are supplied.

Figure 9:
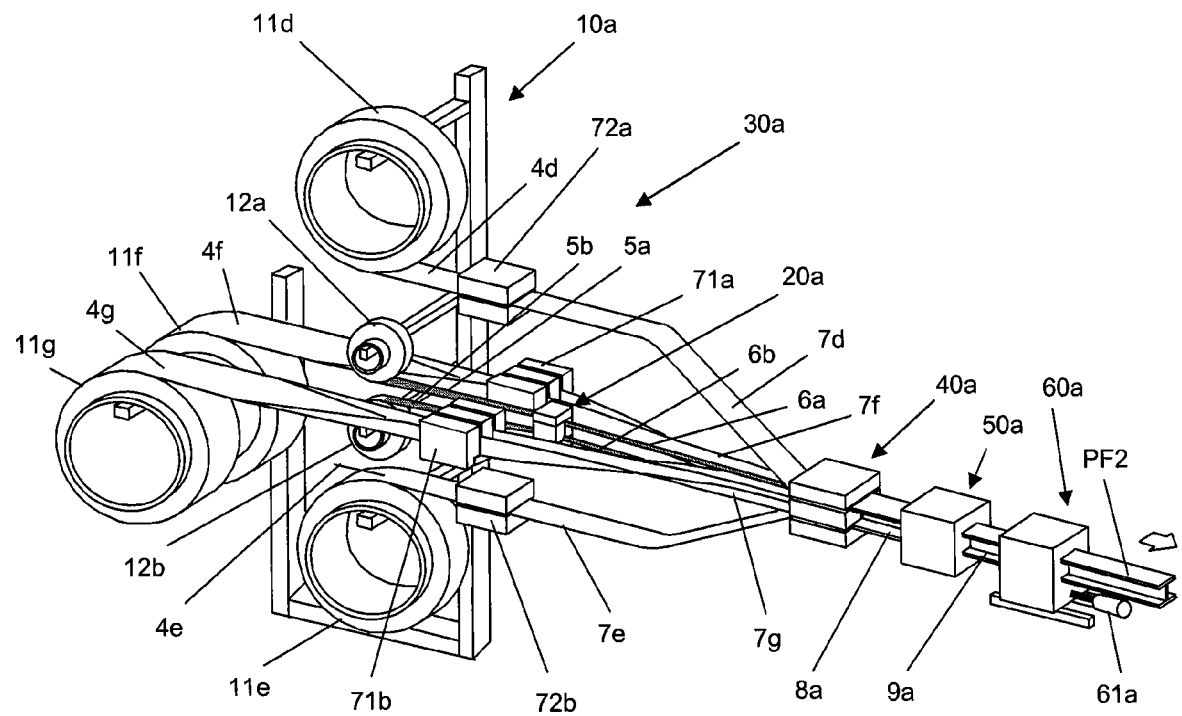
FIG. 9 shows a schematic perspective view of another type of the preform manufacturing apparatus according to one embodiment of the invention.

FIG. 9 shows a perspective view of another embodiment of the apparatus for manufacturing a preform of the invention that is different from that shown in FIG. 1. Whereas the embodiment illustrated in FIG. 1 represents an apparatus to produce a preform having a T-shaped cross-section, the embodiment shown in FIG. 9 represents an apparatus to produce a preform having an I-shaped cross-section.

In FIG. 9, the apparatus to manufacture a preform having an I-shaped cross-section comprises a material supply unit 10a, a filler shaping unit 20a, a partial shaping unit 30a, a uniting unit 40a, a trimming unit 50a and a traction unit 60a that are placed from upstream to downstream in this order.

Figure 10:
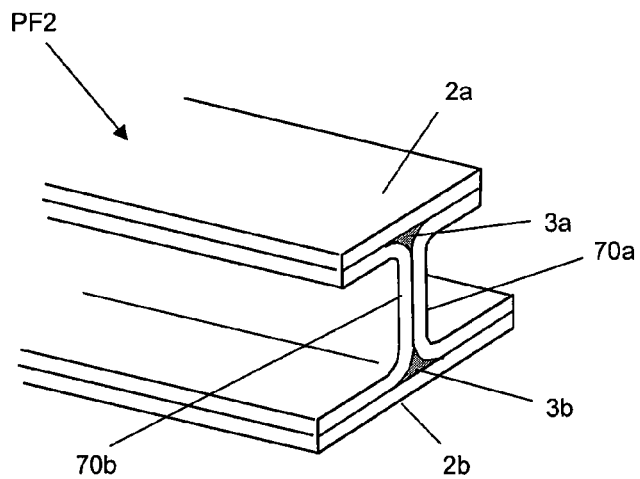
FIG. 10 shows a perspective view of a typical I-shaped (or H-shaped) preform that may be produced by the manufacturing apparatus illustrated in FIG. 9.

FIG. 10 shows a perspective view of a typical preform having an I-shaped cross-section. The preform PF2 given in FIG. 10 comprises two C-shaped portion 70a and 70b, each of which is produced by processing layered strip of reinforcing fiber cloths, two flat-plate-shaped portions 2a and 2b, and corner fillers 3a and 3b to fill the gaps formed on the circumferential side of the bent regions. As in the case of the T-shaped one shown in FIG. 2, the perpendicular part and the horizontal part of the preform PF2 shown in FIG. 10 are referred to as web portion and flange portion, respectively.

The material supply unit 10a holds four layered strip rolls 11d, 11e, 11f and 11g that act as supply sources of the layered strips that form the two C-shaped portions 70a and 70b and the two-flat-plate portions 2a and 2b, and filler material rolls 12a and 12b that act as supply sources of reinforcing fiber bundles that form the two corner filler 3a and 3b.

A preliminary shaping die in the filler shaping unit 20a has two holes, each having a shape that corresponds to the cross-section of the corner filler to be used to fill each of the two branching portions in the final preform having an I-shaped cross-section. These two holes should preferably be located at proper positions in such a way that their axes coincide with those of the corner fillers in the uniting unit 40a placed downstream.

The partial shaping unit 30a comprises four preliminary shaping units including two C-shaped preliminary shaping units 71a and 71b, each consisting of paired dies that form a gap having a C-shaped cross-section, and two flat-plate preliminary shaping units 72a and 72b, each consisting of paired dies that form a gap having a straight cross-section.

Figure 11:
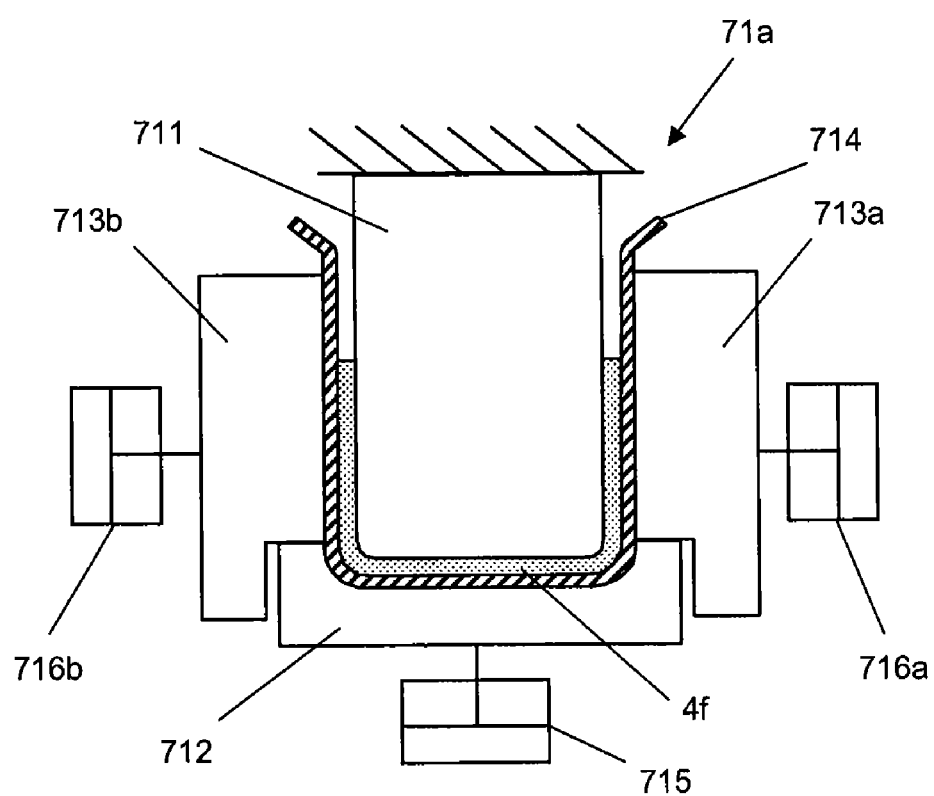
FIG. 11 shows a schematic front view of a C-type preliminary shaping unit to be used in the manufacturing apparatus illustrated in FIG. 9.

The C-shaped preliminary shaping units 71a and 71b have the same shape. FIG. 11 shows the cross-section of the C-shaped preliminary shaping unit 71a, one of the pair. In FIG. 11, an inner die 711 placed inside the C-shaped gap is surrounded by a central die 712 and two side dies 713a, 713b, with a C-shaped thin plate 714 held in between. The inner die 711 is fixed on a stationary base which is not shown in the drawing. The central die 712 and the side dies 713a and 713b are connected to actuators 715, 716a and 716b, respectively. This allows the central die 712 and the side dies 713a and 713b to be moved away from and closer to the inner die 711. In this way, the force to press the layered strips in the die unit is applied and removed.

The shaping dies contained in the uniting unit 40a are so configured that the gap formed between the paired dies has an I-shaped cross-section.

Each die in the filler shaping unit 20a, partial shaping unit 30a and uniting unit 40a contains a structure therein for circulation of a heating medium to perform temperature control as in the case of the embodiment given in FIG. 1. This allows the dies to be adjusted to a required temperature for shaping. The dies in the partial shaping unit 30a and the uniting unit 40a are moved away from and closer to each other by means of actuators that are not shown in the drawing, allowing the material introduced to be heated and/or pressed.

As in the embodiment shown in FIG. 1, the trimming unit 50a has a trimming mechanism to adjust the shape of the edge of the preform produced.

The traction unit 60a has a preform grip mechanism to hold the I-shaped preform. Furthermore, the traction unit 60a has an actuator 61a to move the entire preform grip mechanism to and fro in the longitudinal direction of the preform.

In cases where the preform manufacturing apparatus shown in FIG. 9 is used to produce the I-shaped preform shown in FIG. 10, the four layered strip rolls 11d, 11e, 11f and 11g and the two corner filler material rolls 12a and 12b are first mounted on the material supply unit 10a. The materials used are the same as those in the embodiment shown in FIG. 1.

The flow of the material processing is described below from upstream to downstream. First, the reinforcing fiber bundles 5a and 5b pulled out of the filler material rolls 12a and 12b pass through the holes in the filler shaping unit 20a, which have the same cross-sectional shape as the corner fillers to be produced, and simultaneously undergo heating and pressing to provide preliminary shaped bodies 6a and 6b that have the same cross-sectional shape as the intended corner filler.

The layered strips 4d, 4e, 4f and 4g pulled out of the layered strip rolls 11d, 11e, 11f and 11g are introduced into the partial shaping unit 30a. Here, the layered strips 4d and 4e are heated and pressed in the flat plate preliminary shaping units 72a and 72b, and that state is maintained to provide flat-plate-shaped preliminary shaped bodies 7d and 7e. The layered strips 4f and 4g are heated and pressed in the C-shaped shaping units 71a and 71b, and that state is maintained to provide C-shaped preliminary shaped bodies 7f and 7g.

As shown in FIG. 11, in the C-shaped shaping unit, the central die 712 and side dies 713a and 713b that are moved by means of the actuators 715, 716a and 716b to press a layered strip 4f against the inner die 711 with a thin plate 714 held in between. In this step, the order of moving the central die 712 and the side dies 713a and 713b is such that the central die 712 is moved first followed by the side dies 713a and 713b. This can prevent wrinkles that can be result from the difference between the inside and outside circumferences that takes place when the layered strip 4f is bent.

The existence of the thin plate 714 serves to prevent the layered strip 4f from being pressed out into the gap between the central die 712 and the side dies 713a and 713b. There are no specific limitations on the material type and thickness of the thin plate 714 as long as it is of flexible material that can be properly set in the die and the layered strip 4f can be pressed uniformly. Considering the durability and release properties, the thin plate 714 should preferably be a steel plate having a thickness of about 0.07 to 0.15 mm that is coated with fluorine-based resin.

The preliminary shaped bodies 6a, 6b, 7d, 7e, 7f and 7g are conveyed to the subsequent uniting unit 40a where they are gathered to form a preform having an I-shaped cross-section. During this step in this embodiment, the preliminary shaped bodies 7f and 7g, in particular, that form the C-shaped portion is pulled out of the C-shaped shaping unit with its open part facing upward, but has to be turned sideways before it reaches the uniting unit 40a so that the open part comes to the side position of the I-shaped preform. Thus, the preliminary shaped bodies 7f and 7g are twisted by 90° in the opposite directions around the length direction, and at the same time they are moved closer to each other and bent to change the traveling direction.

Meanwhile, the corner filler preliminary shaped bodies 6a and 6b are sent to the uniting unit 40a without being damaged by the bending in this step if the axis of the hole in the filler shaping unit 20a coincides with that of the corner filler in the uniting unit 40a as described previously.

And finally, the two C-shaped preliminary shaped bodies 7f and 7g are combined, back to back, in their central regions, and the flat-plate-shaped preliminary shaped bodies 7d and 7e are combined to the top and bottom horizontal regions, followed by introducing them to the uniting unit 40a with the gaps at the corners being filled with the preliminary shaped bodies 6a and 6b, which have already been processed to have the cross-sectional shape of the intended corner filler.

Then, in the uniting unit 40a, the I-shaped web portion is clamped first, followed by the I-shaped flange portion, and they are maintained in a pressed and/or heated state to provide a preform 8a that has the same I-shaped cross-sectional shape as the final product except for the length of the edges.

Subsequently, the edges of the preform 8a are trimmed in the trimming unit 50a to remove unnecessary parts, as in the case of the embodiment shown in FIG. 1, to provide an edge-trimmed preform 9a that has an intended cross-sectional shape. The edge-trimmed preform 9a is sent downstream through the traction unit 60a to enable continuous production of a preform PF2 that has an I-shaped cross-sectional shape.

The preforms PF1 and PF2 produced in the above embodiment are then used as reinforcing fiber material to reinforce resin in a fiber reinforced plastics manufacturing process. Usually, a preform is cut to a required length and matrix resin is injected into the preform, followed by curing the injected resin to provide fiber reinforced plastics (FRP).

Two embodiments are described above by referring to FIG. 1 and FIG. 9, but the invention is not limited by these embodiments. The existence of the partial shaping step and the uniting step in a continuous process is a feature of the method for continuous production of a preform that is high in the straightness of reinforcing fiber, uniform in the density of the reinforcing fiber in the preform and free of wrinkles.

The reinforcing fiber layered strip is heated and pressed in the partial shaping step; it is maintained in that state so that resin interlayers and other resin components contained in the reinforcing fiber cloth, along with the reinforcing fiber itself in some cases, are softened and allowed to flow to reduce the volume, thereby producing a preliminary shaped body has a properly finished partial shape that is equivalent to the corresponding part of the final cross-section; and the preliminary shaped body is united with other preliminary shaped bodies or other reinforcing fiber base materials in the uniting step to provide a complete preform.

This point is described more in detail below. For instance, if, in the T-shaped preform production process in the above embodiment, a layered strip comprising three layers of reinforcing fiber cloths is pressed in the uniting unit (uniting-shaping die 40) shown in FIG. 5 without processing it into a preliminary shaped body, wrinkles will result from the difference between the lengths in the inside and the outside of the layered strip that takes place along the line where the layered strip is bent to form the web portion and the flange portion that extend in different directions, even if the corner filler has been processed in a preliminary shaped body.

Figure 7:
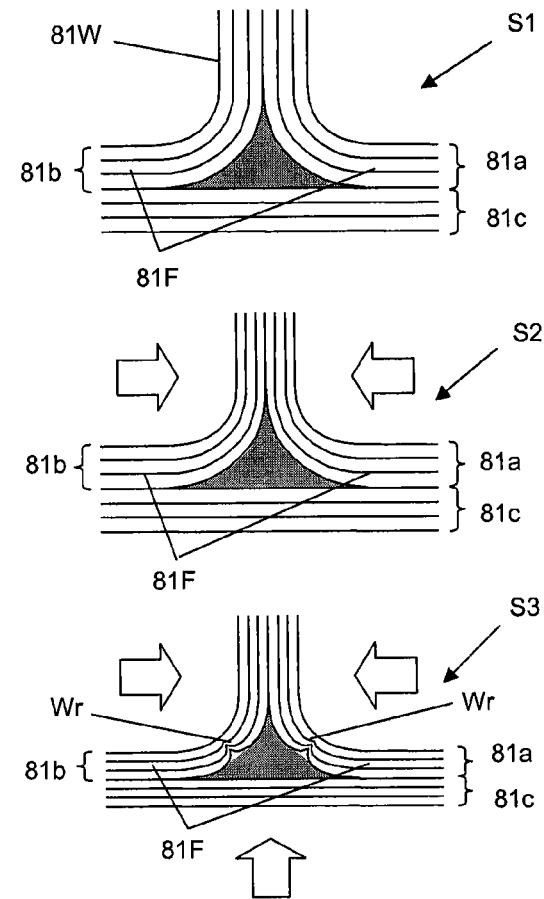
FIG. 7 shows cross-sectional exemplary diagrams for explaining changes occurring in a form of fiber base material during production of a preform in a conventional preform manufacturing apparatus.

Wrinkles that can take place under such conditions are illustrated in the schematic diagram in FIG. 7. In FIG. 7, three bulky layered strips 81a, 81b and 81c before a pressing step are arranged between dies as shown in the state S1 where reinforcing fiber cloth layers are maintained straight. Then, a web portion 81W is pressed as seen in the state S2. As a flange portion 81F is pressed subsequently, the compression of the layered strip will result in an excess length in the circumferential element in the region where the strip is bent as shown in the state S3. Thus, the wrinkles Wr are produced in the state S3.

The partial shaping step of the invention helps to prevent these wrinkles from taking place. In particular, wrinkles can easily result from the difference between the inside and outside circumferences that takes place in the region where the layered strip is bent to from a branching portion in the cross-section. To prevent the formation of these wrinkles as effectively as possible, a base material that will form a branching portion in the cross-section of a preform should be properly processed to have such a cross-sectional shape having a branching portion before it is united with other base materials to produce a preform.

Figure 8:
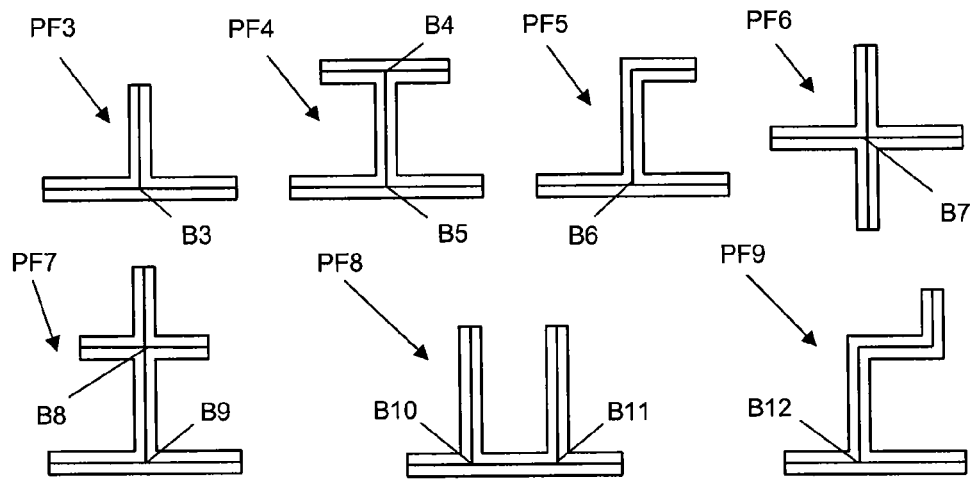
FIG. 8 shows schematic diagrams of the cross-sections of seven kinds of preforms that can be produced by the preform manufacturing process according to aspects of the invention.

The branching portion is defined as the region where the web portion and the flange portion cross each other to form a T-shaped, Y-shaped or cross-shaped cross-section. Thus, the present invention is particularly effective in producing a preform having a cross-section having a branching portion. FIG. 8 shows seven preforms having a branching portion.

A preform PF3 shown in FIG. 8, which is the same as the preform PF1 shown in FIG. 2, has a branching portion B3. A preform PF4, which is the same as the preform PF2 shown in FIG. 10, has branching portions B4 and B5. A preform PF5, in which the top end of the web portion is bent to the right, has a branching portion B6. A preform PF6 has a cross-shaped cross-section having a branching portion B7. A preform PF7 is a combination of a T-shaped and I-shaped preforms having branching portions B8 and B9. A preform PF8 is a combination of T-shaped preforms united in parallel each other having branching portions B10 and B11. A preform PF9, in which the upper part of the web portion is bent to the right and the end part is bent upward, has a branching portion B12.

After being heated and pressed in the partial shaping step, the layered strip is processed to maintain the resulting shape so that it can be compressed to form a preliminary shaped body having an increased volume percentage of fiber (Vpf). This compression should preferably be performed to the extent that a cross-section of the preliminary shaped body becomes close to the final cross-section, or that its volume percentage of fiber (Vpf) is close to or same to that of the preform coming out of the uniting step. Such a degree of compression of the layered strip serves to prevent the wrinkles describe above from taking place in the uniting step.

In terms of the processing capacity of the apparatus for continuously preform production, however, the factor that determines the processing speed of the apparatus is the retention time in each step required to decrease the volume of the layered strip by heating and pressing. A long retention time in the partial shaping step is required to allow the partial shaping step to achieve a volume percentage of fiber (Vpf) nearly equal to that at the ending time of the uniting step, whereas the uniting step can be finishes in a very short retention time required to adhere each preliminary shaped body. Therefore, the overall processing capacity depends on the long retention time in the partial shaping step, but this is not efficient. And this causes a serious problem when the intended final volume percentage of fiber (Vpf) is relatively high, for example, 40% or above, or when the layered strip contains a large amount of interlayer resin.

An effective way to solve this problem is to control the volume percentage of fiber (Vpf) in the partial shaping step at a level that is relatively low but will not have adverse influence on the subsequent uniting step, followed by achieving the intended final volume percentage of fiber (Vpf) in the uniting step. Such a level of volume percentage of fiber (Vpf) that is relatively low but will not have adverse influence should preferably meet the following equation.

$$0.95 \geq \alpha/\beta \geq 0.6$$

or more preferably $$0.95 \geq \alpha/\beta \geq 0.8$$

Where α and β represent Vpf of the preliminary shaped body and that of the preform, respectively.

Thus, if the Vpf of the preliminary shaped body is controlled at about 60% to 95%, more preferably 80% to 95%, of that of the preform, the work of compressing the layered strips can be shared between the two steps for partial shaping and uniting to prevent an excessively long time from being consumed by either step, thereby minimizing the overall processing time of the manufacturing apparatus. And this serves very effectively to prevent wrinkles and ununiform density distributions in the reinforcing fiber in the uniting step.

To measure the volume percentage of fiber (Vpf), firstly, it is necessary to measure a thickness of a measuring sample, that is, a raw base material of a reinforcing fiber base material, a layered strip or a preliminary shaped body. The thickness of the measuring sample is measured under a pressure of 101.3 kPa applied in the vertical direction to the surface of the measuring sample. The method used to apply the pressure may be wrapping the measuring sample with a sheet such as film, followed by evacuation to apply an air pressure, or placing the measuring sample between a flat plate and a pressure plate (for instance, a disk of 25 mm diameter), followed by applying to the pressure plate a suitable force that depends on the size of the pressure plate. The data relating to thickness and volume percentage of fiber (Vpf) given in the present specification are based on measurements by the evacuation method.

In carrying out aspects of the invention, it is not necessary to perform partial shaping for all portions as described in the above embodiments. In the case of a preform having a T-shaped cross-section, for instance, a partial base material having no bent portion, such as a flat-plate-shaped portion to be combined with a flange portion, may not undergo a partial shaping step, but may be used in the form of the original layered strip and united with a partial shaped L-shaped portion. Thus, at least one portion that will constitute an important part of the final preform in terms of straightness of the reinforcing fiber and uniformity of the density may be processed into a preliminary shaped body and then united not only with other preliminary shaped bodies but also with other reinforcing fiber base materials having no formed partial shape therein.

The second reinforcing fiber base material to be united with the first reinforcing fiber base material to form a preform may not necessarily be a layered strip comprising layered multiple reinforcing fiber cloths and an adhesive resin provided between the layered reinforcing fiber cloths such as used in the above embodiments, but may be a layered strip having no adhesive resin between the layered reinforcing fiber cloths, a simple sheet of reinforcing fiber cloth, or a rod or a tube of a reinforcing fiber cloth, as the case may be.

A thermoplastic resin is used in the above embodiments as the adhesive resin provided in the interlayers of the layered strip or applied over its surface as the case may be, such thermoplastic resins including, for instance, a polyolefin resin, styrene-based resin, polyamide resin and polyurethane resin. The adhesive resin may also be a thermosetting resin such as, for instance, an epoxy resin, phenol resin or unsaturated polyester resin. The adhesive resin, however, should work as an adhesive when heated. Considering their handling at ordinary temperature, the adhesive resin should preferably have a glass transition temperature (Tg) in the range of about 30 to 100° C. Such resins may be used as the adhesive resin contained in the reinforcing fiber bundle for the corner filler.

The adhesive resin may be in the form of fiber, particle or emulsion. The adhesive resin may not necessarily be existed in the interlayers in the layered reinforcing fiber cloths, but may be dispersed randomly inside the reinforcing fiber cloth. When an adhesive resin in a form of fiber is used, the adhesive resin fiber may be lined up in the reinforcing fiber bundle, used as auxiliary yarns inserted as warps and/or wefts into a woven fabric, used as stitching yarns inserted through multiple layers of reinforcing fiber cloths. There are no specific limitations on the form of the adhesive resin if the interlayers can be adhered by heating and pressing.

There are no specific limitations on the type of the reinforcing fiber that constitutes the reinforcing fiber cloth and corner filler. Useful reinforcing fibers include, for instance, carbon fiber, glass fiber, organic fiber (such as aramid fiber, polyparaphenylene benzobisoxazole fiber, phenol fiber, polyethylene fiber, polyvinyl alcohol fiber), metal fiber, ceramic fiber, and their combinations. In particular, carbon fiber is high in specific strength, specific modulus and water absorption resistance, and therefore preferable as material for structural members of aircraft and automobiles that require high mechanical characteristics.

There are no specific limitations on the form of the reinforcing fiber cloth if it comprises reinforcing fibers arranged at least in one direction. Useful forms of reinforcing fiber cloth include woven fabric, knitted fabric, braided fabric, nonwoven fabric, unidirectional fiber sheet, which comprises reinforcing fibers arranged in one direction and morphologically stabilized with a binder, fusion-bonding type nonwoven fabric or stitch thread, and multi-axial sheet, which comprises unidirectional fiber sheets laminated with their directions of arranged fibers shifted from one another. In particular, preforms used to produce structural members of transport equipment, such as aircraft in particular, are required to have high mechanical characteristics (compressive strength in particular). To meet this requirement, unidirectional cloth and combined unidirectional cloth sheets are particularly preferred because they can achieve a high reinforcing fiber straightness and high volume percentage of fiber (Vpf).

For the supply of a layered strip, the layered strip should preferably be in the form a roll, if it is possible as in the above embodiments, because rolls are small in size and suitable for storage of long strips. If the layered strip is thick because of comprising many reinforcing fiber cloth layers, the layered strip is deformed as it is rolled up to cause a difference in the circumferential length of the layers, resulting in slippage between them. If the interlayers in the layered strip are adhered at some points, they can be removed, making it impossible to maintain the layered strip in the intended state. Such a layered strip should preferably be stored on a flat container such as tray without curling it. If each reinforcing fiber cloth layer to constitute the layered strip is in the form of a roll, several single layer rolls, whose number is the same as that of the layers in the final layered product, may be used to allow the reinforcing fiber cloth strips to be combined to provide a layered strip before being sent to the partial shaping step and uniting step.

As the processing means for heating and/or pressing a layered strip or preliminary shaped body, heated dies are pressed against each other in the above embodiments. This pressing method is preferred because a required temperature and pressure can be set up accurately and a required durability and operating stability are also achieved properly.

The material of the shaping dies to be used may be rigid one such as metal and resin, or a soft one such as rubber and elastomer. The dies, however, should preferably be made of a metal that is high in heat conduction, rate of heat transfer to the reinforcing fiber and, hopefully, durability, because the material in a die is heated by contact heating with the die.

Useful die heating means other than described above include the use of radiation heat, atmosphere heat and blast of heated gas. Useful die pressing means other than described above include wrapping the die with film-like material or putting it in a bag followed by applying an internal pressure. An appropriate heating means and pressing means are selected to meet the characteristics of the material and properties of the perform to be produced.

The heating temperature for processing a layered strip or preliminary shaped body should preferably be higher than the glass transition temperature (Tg) of the adhesive resin existing in the interlayers to allow then work effectively as adhesive. If the temperature is too high, however, an excessive amount of adhesive resin can form film-like resin layers between the reinforcing fiber cloth layers and prevent smooth flow of the matrix resin injected in a subsequent step, although the required processing time can be shorter. For an adhesive resin having a glass transition temperature (Tg) in the range of 30 to 100° C., the heating temperature for processing should preferably be in the range of about 40 to 130° C.

If the pressure applied in the pressing step is too high, the reinforcing fiber will deform in the thickness direction before the adhesive resin in the interlayer starts to flow, and the reinforcing fiber layers that are faced with each other with the interlayers in between will come in contact with each other to fill the space existing in the interlayers to prevent the flow of the interlayer resin during the subsequent step for matrix resin injection. The pressure should preferably be above the atmospheric pressure and in the range of 0.1 to 1.0 MPa.

The conveyance unit (traction unit) may be separate from others, but may be combined with the trimming unit. The conveyance unit (traction unit) performs the two functions of gripping the preform and carrying it in the longitudinal direction, but the trimming unit also has the gripping function, and therefore, if this gripping function is maintained at a satisfactorily high level, the trimming unit will be able to serve simultaneously to grip the material for conveyance (traction) while trimming it, making it possible, by adding a carrying function to this unit, to eliminate the conveyance unit (traction unit).

The preform manufacturing process or manufacturing apparatus of the present invention serves to intermittently convey in the longitudinal direction a raw base material for the reinforcing fiber base material having a branching portion in its cross-section that will constitute the intended preform, and heat and/or press the raw base material during the conveyance suspension periods to form a preliminary shaped body, followed by uniting the resulting preliminary shaped body with a raw base material of the other reinforcing fiber base materials that will constitute the intended preform, thereby enabling continuous production of a preform that has a branching portion in its cross-section. This prevents the formation of wrinkles, which are generally formed in the reinforcing fiber in a preform that is manufactured continuously by the conventional method, and serves for continuous manufacturing of a perform that can be used to produce structural members of, for instance, automobiles and aircraft.

The invention claimed is:

1. A process for manufacturing a preform comprising a first reinforcing fiber base material having, in its cross-section, a web portion and at least one pair of flange portions extending in opposite side each other through at least one branching portion from the web portion, and at least one second reinforcing fiber base material that is united with the first reinforcing fiber base material in a state including the at least one branching portion between them wherein:

(a) the first reinforcing fiber base material comprises a first raw base material and a second raw base material, (b) the first raw base material comprises a first layered strip comprising layered multiple reinforcing fiber cloths and an adhesive resin provided between the layered reinforcing fiber cloths, (c) the second raw base material comprises a second layered strip comprising layered multiple reinforcing fiber cloths and an adhesive resin provided between the layered reinforcing fiber cloths, (d) the second reinforcing fiber base material comprises at least one third raw base material, (e) a first supply step for supplying the first layered strip, a second supply step for supplying the second layered strip, and at least one third supply step for supplying the at least one third raw base material are provided, (f) a first partial shaping step is provided on the downstream side of the first supply step for shaping the first layered strip by heating and/or pressing and maintaining the shaped state, thereby producing a first preliminary shaped body, (g) a second partial shaping step is provided on the downstream side of the second supply step for shaping the second layered strip by heating and/or pressing and maintaining the shaped state, thereby producing a second preliminary shaped body, (h) a uniting step is provided on the downstream side of the first and second partial shaping steps and the at least one third supply step to unite the first and second preliminary shaped bodies produced in the first and second partial shaping steps in such a way that the branching portion is formed in the preform and the at least one third raw base material is added at the branching portion formed, followed by uniting them by heating and/or pressing them in the configuration and maintaining the united state, thereby providing the preform, (i) a conveyance step is provided on the downstream side of the uniting step to intermittently convey the preform produced in the uniting step, and (j) the production of the first and second preliminary shaped bodies in the first and second partial shaping steps and the production of the preform in the uniting step are carried out during the periods when the conveyance of the preform in the conveyance step is suspended, and wherein the first and second preliminary shaped bodies meet the relationship $0.95 \geq \alpha/\beta \geq 0.6$ where $\alpha$ is their respective volume percentage of fiber and $\beta$ is the volume percentage of fiber in the preform.

2. The process for manufacturing a preform according to claim 1, wherein the volume percentage of fiber of $\alpha$ and the volume percentage of fiber of $\beta$ meet the relationship $0.95 \geq \alpha/\beta \geq 0.8$.

3. The process for manufacturing a preform according to claim 1, wherein a trimming step is provided on the downstream side of the uniting step and on the upstream side of the conveyance step to remove unnecessary parts from the preform produced in the uniting step.

4. The process for manufacturing a preform according to claim 1, wherein at least one corner filler supply step is provided so that at least one corner filler comprising a reinforcing fiber bundle is supplied to at least one concave portion formed along the outer surface of the at least one branching portion produced in the uniting step in coordination with the intermittent preform conveyance motion in the conveyance step.

5. The process for manufacturing a preform according to claim 4, wherein the reinforcing fiber bundle constituting the corner filler is a reinforcing fiber bundle containing an adhesive resin, and at least one corner filler partial shaping step that shapes the reinforcing fiber bundle containing the adhesive resin by heating and/or pressing and maintaining the shaped state to produce at least one preliminary shaped corner filler body is provided between the at least one corner filler supply step and the uniting step to allow the preliminary shaped corner filler body thus produced to be supplied to the uniting step.

6. The process for manufacturing a preform according to claim 5, wherein the at least one third raw base material comprises at least one third layered strip comprising layered multiple reinforcing fiber cloths and an adhesive resin provided between the layered reinforcing fiber cloths, and at least one third partial shaping step that shapes the at least one third layered strip by heating and/or pressing and maintaining the shaped state to produce at least one third preliminary shaped body is provided between the at least one third supply step and the uniting step to allow the at least one third preliminary shaped body thus produced to be supplied to the uniting step.

7. The process for manufacturing a preform according to claim 6, wherein the cross-section of the first preliminary shaped body and that of the second preliminary shaped body have L shapes that are bilaterally symmetric while one cross-section of the one third preliminary shaped body has a flat plate shape, and wherein in the uniting step, the L-shaped first preliminary shaped body and the L-shaped second preliminary shaped body are united at the position corresponding to the L-shaped web portion while the flat-plate-shaped third preliminary shaped body and the preliminary shaped corner filler body are united to form a T-shaped preform.

8. The process for manufacturing a preform according to claim 6, wherein the cross-section of the first preliminary shaped body and that of the second preliminary shaped body have C shapes that are bilaterally symmetric while the cross-sections of the two third preliminary shaped bodies have flat plate shapes, and wherein in the uniting step, the C-shaped first preliminary shaped body and the C-shaped second preliminary shaped body are united at the position corresponding to the C-shaped web portion while the two flat-plate-shaped third preliminary shaped bodies are united with the two preliminary shaped corner filler bodies to form an I-shaped preform.

9. An apparatus for manufacturing a perform comprising a first reinforcing fiber base material having, in its cross-section, a web portion and at least one pair of flange portions extending in opposite side each other through at least one branching portion from the web portion, and at least one second reinforcing fiber base material that is united with the first reinforcing fiber base material in a state including the at least one branching portion between them wherein:

(1-a) the first reinforcing fiber base material comprises a first raw base material and a second raw base material,
(1-b) the first raw base material comprises a first layered strip comprising layered multiple reinforcing fiber cloths and an adhesive resin provided between the layered reinforcing fiber cloths,
(1-c) the second raw base material comprises a second layered strip comprising layered multiple reinforcing fiber cloths and an adhesive resin provided between the layered reinforcing fiber cloths,
(1-d) the second reinforcing fiber base material comprises at least one third raw base material,
(1-e) a first supply unit to supply the first layered strip, a second supply unit to supply the second layered strip, and at least one third supply unit to supply the at least one third raw base material are provided,
(1-f) a first partial shaping unit is provided on the downstream side of the first supply unit to shape the first layered strip by heating and/or pressing and maintaining the shaped state, thereby producing a first preliminary shaped body,
(1-g) a second partial shaping unit is provided on the downstream side of the second supply unit to shape the second layered strip by heating and/or pressing and maintaining the shaped state, thereby producing a second preliminary shaped body,
(1-h) a uniting unit is provided on the downstream side of the first and second partial shaping units and the at least one third supply unit to unite the first and second preliminary shaped bodies produced in the first and second partial shaping units in such a way that the branching portion is formed in the preform and the at least one third raw base material is added at the branching portion formed, followed by uniting them by heating and/or pressing them in the configuration and maintaining the united state, thereby providing the preform,
(1-i) a conveyance unit is provided on the downstream side of the uniting unit to intermittently convey the preform produced in the uniting unit, and
(1-j) the production of the first and second preliminary shaped bodies in the first and second partial shaping units and the production of the preform in the uniting unit are carried out during the periods when the conveyance of the preform in the conveyance unit is suspended,
wherein at least one corner filler supply unit is provided so that at least one corner filler comprising a reinforcing fiber bundle is supplied to at least one concave portion formed along the outer surface of the at least one branching portion produced in the uniting unit in coordination with the intermittent preform conveyance motion in the conveyance unit,
wherein the reinforcing fiber bundle constituting the corner filler is a reinforcing fiber bundle containing an adhesive resin, and at least one corner filler partial shaping unit that shapes the reinforcing fiber bundle containing the adhesive resin by heating and/or pressing and maintaining the shaped state to produce at least one preliminary shaped corner filler body is provided between the at least one corner filler supply unit and the uniting unit to allow the preliminary shaped corner filler body thus produced to be supplied to the uniting unit, and
wherein the at least one third raw base material comprises at least one third layered strip comprising layered multiple reinforcing fiber cloths and an adhesive resin provided between the layered reinforcing fiber cloths, and at least one third partial shaping unit that shapes the at least one third layered strip by heating and/or pressing and maintaining the shaped state to produce at least one third preliminary shaped body is provided between the at least one third supply unit and the uniting unit to allow the at least one third preliminary shaped body thus produced to be supplied to the uniting unit, and
further comprising the first partial shaping unit, the second partial shaping unit and the third partial shaping unit that are combined into one partial shaping die wherein:
(2-a) the partial shaping die comprises a central die fixed on a stand, an upper die provided above the central die with a gap in between, and a lower die provided below the central die with a gap in between,
(2-b) the upper die and the central die have first shaping faces to receive and then heat and/or press the first layered strip and second shaping faces to receive and then heat and/or press the second layered strip, (2-c) the lower die and the central die have third shaping faces to receive and then heat and/or press the third layered strip, (2-d) a first actuator to move the upper die relative to the central die is provided on the upper die while a second actuator to move the lower die relative to the central die is provided on the lower die, and (2-e) a hole is provided in the central region of the central die to allow the preliminary shaped corner filler body to pass through.

10. An apparatus for manufacturing a perform comprising a first reinforcing fiber base material having, in its cross-section, a web portion and at least one pair of flange portions extending in opposite side each other through at least one branching portion from the web portion, and at least one second reinforcing fiber base material that is united with the first reinforcing fiber base material in a state including the at least one branching portion between them wherein:

(1-a) the first reinforcing fiber base material comprises a first raw base material and a second raw base material, (1-b) the first raw base material comprises a first layered strip comprising layered multiple reinforcing fiber cloths and an adhesive resin provided between the layered reinforcing fiber cloths, (1-c) the second raw base material comprises a second layered strip comprising layered multiple reinforcing fiber cloths and an adhesive resin provided between the layered reinforcing fiber cloths, (1-d) the second reinforcing fiber base material comprises at least one third raw base material, (1-e) a first supply unit to supply the first layered strip, a second supply unit to supply the second layered strip, and at least one third supply unit to supply the at least one third raw base material are provided, (1-f) a first partial shaping unit is provided on the downstream side of the first supply unit to shape the first layered strip by heating and/or pressing and maintaining the shaped state, thereby producing a first preliminary shaped body, (1-q) a second partial shaping unit is provided on the downstream side of the second supply unit to shape the second layered strip by heating and/or pressing and maintaining the shaped state, thereby producing a second preliminary shaped body, (1-h) a uniting unit is provided on the downstream side of the first and second partial shaping units and the at least one third supply unit to unite the first and second preliminary shaped bodies produced in the first and second partial shaping units in such a way that the branching portion is formed in the preform and the at least one third raw base material is added at the branching portion formed, followed by uniting them by heating and/or pressing them in the configuration and maintaining the united state, thereby providing the preform, (1-i) a conveyance unit is provided on the downstream side of the uniting unit to intermittently convey the preform produced in the uniting unit, and (1-j) the production of the first and second preliminary shaped bodies in the first and second partial shaping units and the production of the preform in the uniting unit are carried out during the periods when the conveyance of the preform in the conveyance unit is suspended, wherein at least one corner filler supply unit is provided so that at least one corner filler comprising a reinforcing fiber bundle is supplied to at least one concave portion formed along the outer surface of the at least one branching portion produced in the uniting unit in coordination with the intermittent preform conveyance motion in the conveyance unit, and wherein the reinforcing fiber bundle constituting the corner filler is a reinforcing fiber bundle containing an adhesive resin, and at least one corner filler partial shaping unit that shapes the reinforcing fiber bundle containing the adhesive resin by heating and/or pressing and maintaining the shaped state to produce at least one preliminary shaped corner filler body is provided between the at least one corner filler supply unit and the uniting unit to allow the preliminary shaped corner filler body thus produced to be supplied to the uniting unit, and further comprising the at least one corner filler partial shaping unit wherein:

(2-a) the unit comprises a corner filler shaping die comprising a flat die fixed on a stand, and a right and a left upper dies fixed respectively on the top face of the flat die, (2-b) the right upper die has a left-side curved face in its left lower edge while the left upper die has a right-side curved face in its right lower edge, the right upper die and the left upper die being in contact with each other in such a way that the left-side curved face and the right-side curved face are faced with each other, (2-c) the portion surrounded by the flat die's top face, the left-side curved face and the right-side curved face constitutes a hole to allow a reinforcing fiber bundle to pass through, the reinforcing fiber bundle being used to produce the corner filler to be supplied from the at least one corner filler supply unit, and (2-d) the cross-sectional size of the hole gradually decreases in the traveling direction of the reinforcing fiber bundle.

11. An apparatus for manufacturing a perform comprising a first reinforcing fiber base material having, in its cross-section, a web portion and at least one pair of flange portions extending in opposite side each other through at least one branching portion from the web portion, and at least one second reinforcing fiber base material that is united with the first reinforcing fiber base material in a state including the at least one branching portion between them wherein:

(1-a) the first reinforcing fiber base material comprises a first raw base material and a second raw base material, (1-b) the first raw base material comprises a first layered strip comprising layered multiple reinforcing fiber cloths and an adhesive resin provided between the layered reinforcing fiber cloths, (1-c) the second raw base material comprises a second layered strip comprising layered multiple reinforcing fiber cloths and an adhesive resin provided between the layered reinforcing fiber cloths, (1-d) the second reinforcing fiber base material comprises at least one third raw base material, (1-e) a first supply unit to supply the first layered strip, a second supply unit to supply the second layered strip, and at least one third supply unit to supply the at least one third raw base material are provided, (1-f) a first partial shaping unit is provided on the downstream side of the first supply unit to shape the first layered strip by heating and/or pressing and maintaining the shaped state, thereby producing a first preliminary shaped body, (1-g) a second partial shaping unit is provided on the downstream side of the second supply unit to shape the second layered strip by heating and/or pressing and maintaining the shaped state, thereby producing a second preliminary shaped body, (1-h) a uniting unit is provided on the downstream side of the first and second partial shaping units and the at least one third supply unit to unite the first and second preliminary shaped bodies produced in the first and second partial shaping units in such a way that the branching portion is formed in the preform and the at least one third raw base material is added at the branching portion formed, followed by uniting them by heating and/or pressing them in the configuration and maintaining the united state, thereby providing the preform, (1-i) a conveyance unit is provided on the downstream side of the uniting unit to intermittently convey the preform produced in the uniting unit, and (1-j) the production of the first and second preliminary shaped bodies in the first and second partial shaping units and the production of the preform in the uniting unit are carried out during the periods when the conveyance of the preform in the conveyance unit is suspended, wherein at least one corner filler supply unit is provided so that at least one corner filler comprising a reinforcing fiber bundle is supplied to at least one concave portion formed along the outer surface of the at least one branching portion produced in the uniting unit in coordination with the intermittent preform conveyance motion in the conveyance unit, wherein the reinforcing fiber bundle constituting the corner filler is a reinforcing fiber bundle containing an adhesive resin, and at least one corner filler partial shaping unit that shapes the reinforcing fiber bundle containing the adhesive resin by heating and/or pressing and maintaining the shaped state to produce at least one preliminary shaped corner filler body is provided between the at least one corner filler supply unit and the uniting unit to allow the preliminary shaped corner filler body thus produced to be supplied to the uniting unit, and wherein the at least one third raw base material comprises at least one third layered strip comprising layered multiple reinforcing fiber cloths and an adhesive resin provided between the layered reinforcing fiber cloths, and at least one third partial shaping unit that shapes the at least one third layered strip by heating and/or pressing and maintaining the shaped state to produce at least one third preliminary shaped body is provided between the at least one third supply unit and the uniting unit to allow the at least one third preliminary shaped body thus produced to be supplied to the uniting unit, and further comprising the uniting unit wherein:

(2-a) the uniting unit comprises a uniting die comprising a left upper die fixed on a stand, a right upper die provided on the right side of the left upper die with a gap in between and a lower die provided below the left upper die and the right upper die with a gap in between, (2-b) the left upper die and the right upper die respectively have a first shaping face that belongs to the left upper die, and a second shaping face that belongs to the right upper die, to receive and heat and/or press the first preliminary shaped body and the second preliminary shaped body, (2-c) the left upper die and the lower die respectively have a third shaping face that belongs to the left upper die, and a fourth shaping face that belongs to the lower die to receive and heat and/or press the first preliminary shaped body and the third preliminary shaped body, (2-d) the right upper die and the lower die respectively have a fifth shaping face that belongs to the right upper die, and a sixth shaping face that belongs to the lower die to receive and heat and/or press the second preliminary shaped body and the third preliminary shaped body, and (2-e) a first actuator is provided on the right upper die to move the right upper die relative to the left upper die while a second actuator is provided on the lower die to move the lower die relative to the left upper die and the right upper die.

12. The apparatus for manufacturing a preform according to claim 9, 10 or 11, wherein a trimming unit is provided on the downstream side of the uniting unit and on the upstream side of the conveyance unit to remove unnecessary parts from the preform produced in the uniting unit.

13. The apparatus for manufacturing a preform according to claim 9 or 11, wherein the cross-section of the first preliminary shaped body and that of the second preliminary shaped body have L shapes that are bilaterally symmetric while one cross-section of the one third preliminary shaped body has a flat plate shape, and wherein in the uniting unit, the L-shaped first preliminary shaped body and the L-shaped second preliminary shaped body are united at the position corresponding to the L-shaped web portion while the flat-plate-shaped third preliminary shaped body and a preliminary shaped corner filler body are united to form a T-shaped preform.

14. The apparatus for manufacturing a preform according to claim 9 or 11, wherein the cross-section of the first preliminary shaped body and that of the second preliminary shaped body have C shapes that are bilaterally symmetric while the cross-sections of the two third preliminary shaped bodies have a flat plate shape, and wherein in the uniting unit, the C-shaped first preliminary shaped body and the C-shaped second preliminary shaped body are united at the position corresponding to the C-shaped web portion while the two flat-plate-shaped third preliminary shaped bodies are united with two preliminary shaped corner filler bodies to form an I-shaped preform.

* * * * *

UNITED STATES PATENT AND TRADEMARK OFFICE
CERTIFICATE OF CORRECTION

PATENT NO. : 7,905,975 B2
APPLICATION NO. : 12/282726
DATED : March 15, 2011
INVENTOR(S) : Tamotsu Suzuki et al.

It is certified that error appears in the above-identified patent and that said Letters Patent is hereby corrected as shown below:

Under column 25, claim 9 (original claim 17), "perform" should be deleted and replaced with --preform--.

Under column 27, claim 10 (original claim 18), "perform" should be deleted and replaced with --preform--.

Under column 28, claim 11 (original claim 19), "perform" should be deleted and replaced with --preform--.

Signed and Sealed this
Twelfth Day of July, 2011

David J. Kappos
*Director of the United States Patent and Trademark Office*